(12) United States Patent
Nose et al.

(10) Patent No.: US 8,144,074 B2
(45) Date of Patent: Mar. 27, 2012

(54) DISPLAY ELEMENT, ELECTRONIC PAPER INCLUDING THE SAME, ELECTRONIC TERMINAL APPARATUS INCLUDING THE SAME, DISPLAY SYSTEM INCLUDING THE SAME, AND METHOD OF PROCESSING IMAGE IN DISPLAY ELEMENT

(75) Inventors: Masayuki Nose, Kawasaki (JP); Hisashi Yamaguchi, Kawasaki (JP); Tsuneo Watanuki, Kawasaki (JP); Makoto Fukuda, Kawasaki (JP); Toshiaki Yoshihara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 582 days.

(21) Appl. No.: 12/411,649

(22) Filed: Mar. 26, 2009

(65) Prior Publication Data
US 2009/0225107 A1 Sep. 10, 2009

Related U.S. Application Data

(63) Continuation of application No. PCT/JP2006/319525, filed on Sep. 29, 2006.

(51) Int. Cl.
G09G 5/00 (2006.01)
(52) U.S. Cl. ........................ 345/1.1; 345/697
(58) Field of Classification Search ............ 345/87–100, 345/204, 211, 695–699
See application file for complete search history.

(56) References Cited

U.S. PATENT DOCUMENTS

| 7,692,611 | B2* | 4/2010 | Jo et al. ........................... 345/77 |
| 2001/0035851 | A1* | 11/2001 | Komatsu et al. ................. 345/87 |
| 2002/0047819 | A1 | 4/2002 | Suehiro et al. |
| 2004/0046705 | A1* | 3/2004 | Masazumi et al. ............. 345/1.1 |
| 2005/0162337 | A1* | 7/2005 | Ohashi et al. .................. 345/1.1 |
| 2006/0181538 | A1* | 8/2006 | Kim .............................. 345/502 |
| 2007/0109215 | A1* | 5/2007 | Goto et al. ..................... 345/1.1 |
| 2007/0273609 | A1* | 11/2007 | Yamaguchi et al. ............ 345/1.1 |
| 2008/0094328 | A1* | 4/2008 | Ishiyama ........................ 345/87 |
| 2008/0207077 | A1* | 8/2008 | Haase ............................ 445/22 |
| 2008/0252639 | A1* | 10/2008 | Ijzerman et al. ............... 345/419 |

FOREIGN PATENT DOCUMENTS

| JP | 10-339890 A | 12/1998 |
| JP | 2001-275128 A | 10/2001 |
| JP | 2002-139746 A | 5/2002 |
| JP | 2004-219715 A | 8/2004 |
| JP | 2004-347764 A | 12/2004 |

OTHER PUBLICATIONS

International Search Report of PCT/JP2006/319525, mailing date Jan. 16, 2007.

\* cited by examiner

*Primary Examiner* — Nitin Patel
(74) *Attorney, Agent, or Firm* — Westerman, Hattori, Daniels & Adrian, LLP; William F. Westerman

(57) ABSTRACT

A liquid crystal display element includes a G display unit, serving as a first display unit, R and B display units and, serving as second and third display units, that are laminated on the G display unit and have display regions arranged so as to correspond to a display region of the G display unit, and a display control unit that performs a reset process of changing the display region to the same display state on the G display unit and then starts the reset process of the R and B display units.

25 Claims, 12 Drawing Sheets

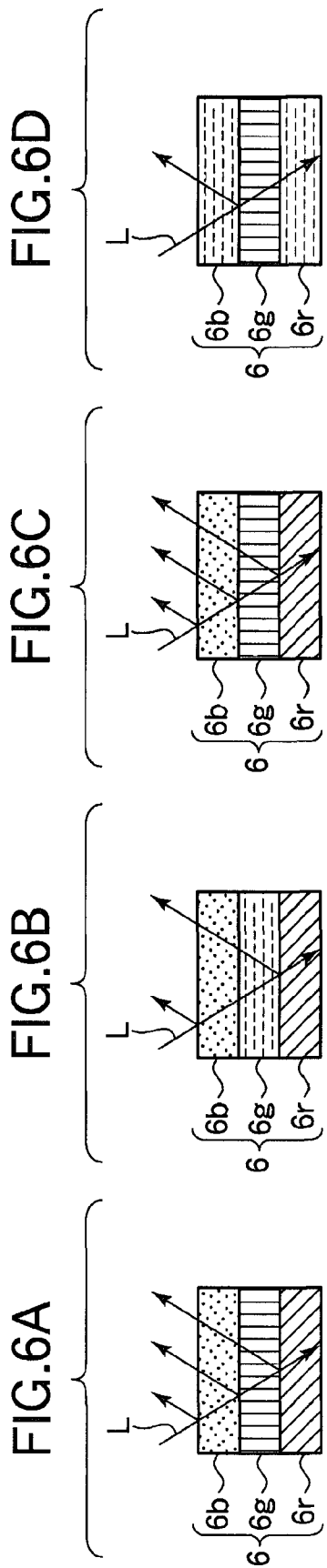
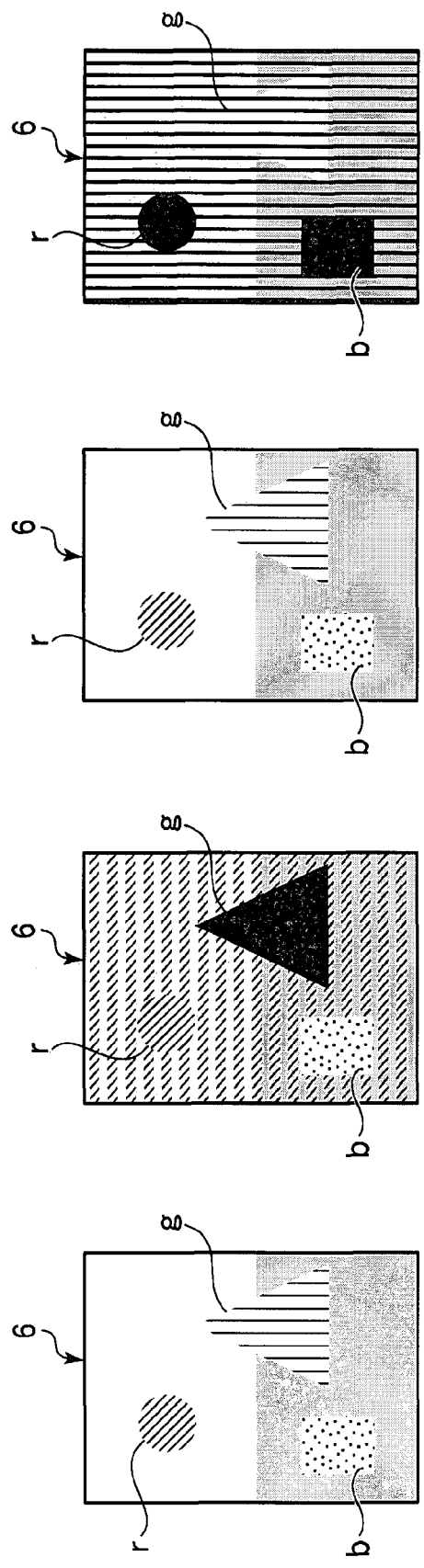

A   B

DISPLAY ELEMENT, ELECTRONIC PAPER INCLUDING THE SAME, ELECTRONIC TERMINAL APPARATUS INCLUDING THE SAME, DISPLAY SYSTEM INCLUDING THE SAME, AND METHOD OF PROCESSING IMAGE IN DISPLAY ELEMENT

This Application is a continuation of International Application No. PCT/JP2006/319525, filed Sep. 29, 2006.

BACKGROUND OF THE INVENTION

1. Field of the Invention

The present invention relates to a display element having a plurality of display units laminated to each other, an electronic paper including the same, an electronic terminal apparatus including the same, a display system including the same, and a method of processing an image in a display element.

2. Description of the Related Art

In recent years, many companies and universities have developed electronic papers. The electronic papers can be applied to portable devices, such as electronic books, sub-displays of mobile terminals, and display units of IC cards. As an example of a display element used for the electronic paper, there is a display element that uses a liquid crystal composition having a cholesteric phase formed therein (cholesteric liquid crystal). The cholesteric liquid crystal has, for example, a semipermanent display retention characteristic (memory property), a clear color display characteristic, a high contrast characteristic, and a high resolution characteristic.

FIG. 11 is a cross-sectional view schematically illustrating the structure of a liquid crystal display element 51 capable of performing full color display using the cholesteric liquid crystal. The liquid crystal display element 51 has a structure in which a blue (B) display unit 46b, a green (G) display unit 46g, and a red (R) display unit 46r are laminated in this order from a display surface. In FIG. 11, the outer surface of an upper substrate 47b serves as the display surface, and external light (solid arrow) is incident on the display surface from the upper side of the substrate 47b. In addition, an observer's eye and a viewing direction (dotted arrow) are schematically depicted above the substrate 47b.

The B display unit 46b includes a pair of upper and lower substrates 47b and 49b, a blue (B) liquid crystal 43b sealed between the two substrates, and a pulse voltage source 41b that applies a predetermined pulse voltage to the B liquid crystal layer 43b. The G display unit 46g includes a pair of upper and lower substrates 47g and 49g, a green (G) liquid crystal 43g sealed between the two substrates, and a pulse voltage source 41g that applies a predetermined pulse voltage to the G liquid crystal layer 43g. The R display unit 46r includes a pair of upper and lower substrates 47r and 49r, a red (R) liquid crystal layer 43r sealed between the two substrates, and a pulse voltage source 41r that applies a predetermined pulse voltage to the R liquid crystal layer 43r. A light absorbing layer 45 is provided on the rear surface of the lower substrate 49r of the R display unit 46r.

The cholesteric liquid crystal used for each of the B, G, and R liquid crystal layers 43b, 43g, and 43r is a liquid crystal mixture of nematic liquid crystal and a relatively large amount of additive, for example, several tens of percent by weight of additive (which is also called a chiral material). When a relatively large amount of chiral material is added to the nematic liquid crystal, it is possible to strongly twist nematic liquid crystal molecules into a helical shape, thereby forming a cholesteric phase. The cholesteric liquid crystal is also called chiral nematic liquid crystal.

The cholesteric liquid crystal has bistability (memory property). It is possible to change the cholesteric liquid crystal to a planar state, a focal conic state, or an intermediate state between the planar state and the focal conic state by adjusting the intensity of an electric field applied to the liquid crystal. Once the cholesteric liquid crystal is changed to the planar state or the focal conic state, the cholesteric liquid crystal stably maintains its state even when no electric field is applied.

The planar state is obtained by applying a predetermined high voltage between the upper and lower substrates 47 and 49 to apply a strong electric field to the liquid crystal layer 43 and then rapidly reducing the electric field to zero. The focal conic state is obtained by applying, for example, a predetermined voltage that is lower than the above high voltage between the upper and lower substrates 47 and 49 to apply an electric field to the liquid crystal layer 43 and then rapidly reducing the electric field to zero. The intermediate state between the planar state and the focal conic state is obtained by applying, for example, a voltage that is lower than that used to obtain the focal conic state between the upper and lower substrates 47 and 49 to apply an electric field to the liquid crystal layer 43 and then rapidly reducing the electric field to zero.

Next, the display principle of the liquid crystal display element using the cholesteric liquid crystal will be described with reference to FIGS. 12A and 12B, using the B display unit 46b as an example. FIG. 12A depicts the arrangement of liquid crystal molecules 33 of the cholesteric liquid crystal when the B liquid crystal layer 43b of the B display unit 46b is in the planar state. FIG. 12B depicts the arrangement of the liquid crystal molecules 33 of the cholesteric liquid crystal when the B liquid crystal layer 43b of the B display unit 46b is in the focal conic state.

Depicted as FIG. 12A, the liquid crystal molecules 33 in the planar state sequentially rotate in the thickness direction of the substrates to form a helical structure, and the helical axis of the helical structure is substantially vertical to the surfaces of the substrates. In the planar state, light having a predetermined wavelength corresponding to the helical pitch of the liquid crystal molecules is selectively reflected from the liquid crystal layer. When the average refractive index of the liquid crystal layer is n and the helical pitch is p, a wavelength λ where the highest reflectance is obtained is represented by λ=n·p.

Therefore, in order to selectively reflect blue light from the B liquid crystal layer 43b of the B display unit 46b in the planar state, the average refractive index n and the helical pitch p are determined such that the wavelength λ is, for example, 480 nm. The average refractive index n can be adjusted by selecting a liquid crystal material and a chiral material, and the helical pitch p can be adjusted by adjusting the content of the chiral material.

Depicted as FIG. 12B, the liquid crystal molecules 33 in the focal conic state sequentially rotate in the in-plane direction of the substrates to form a helical structure, and the helical axis of the helical structure is substantially parallel to the surfaces of the substrates. In the focal conic state, the selectivity of the B liquid crystal layer 43b with respect to a reflection wavelength is lost, and the B liquid crystal layer 43b transmits most of incident light. The transmitted light is absorbed by the light absorbing layer 45 that is provided on the rear surface of the lower substrate 49r of the R display unit 46r. As a result, dark (black) display is obtained.

As described above, it is possible to control the reflection and transmission of light by adjusting the arrangement state of the cholesteric liquid crystal molecules 33 twisted in the helical shape. Similar to the B liquid crystal layer 43b, the cholesteric liquid crystal that selectively reflects green or red light in the planar state is injected into the G liquid crystal layer 43g and the R liquid crystal layer 43r to manufacture the liquid crystal display element 51 capable of performing full color display.

FIG. 13 is a diagram illustrating an example of the reflection spectrum of each of the liquid crystal layers 43b, 43g, and 43r in the planar state. In FIG. 13, the horizontal axis indicates the wavelength (nm) of reflected light, and the vertical axis indicates reflectance (with respect to a white board; %). The reflection spectrum of the B liquid crystal layer 43b is represented by a curved line linking symbols ▲ in FIG. 13. Similarly, the reflection spectrum of the G liquid crystal layer 43g is represented by a curved line linking symbols ■, and the reflection spectrum of the R liquid crystal layer 43r is represented by a curved line linking symbols ♦ in FIG. 13.

Depicted as FIG. 13, in the reflection spectrums of the liquid crystal layers 43b, 43g, and 43r in the planar state, R has the longest center wavelength, followed by G and B. Therefore, the liquid crystal layer 43r has the largest helical pitch of cholesteric liquid crystal, followed by the liquid crystal layers 43g and 43b. Thus, it is necessary to adjust the content of the chiral material in the cholesteric liquid crystal in the liquid crystal layers 43b, 43g, and 43r such that the liquid crystal layer 43b has the largest amount of chiral material, followed by the liquid crystal layers 43g and 43r.

In general, as a reflection wavelength is decreased, it is necessary to reduce the helical pitch of the liquid crystal molecules by strongly twisting. Therefore, the content of the chiral material in the cholesteric liquid crystal is increased. In addition, generally, as the content of the chiral material is increased, a driving voltage tends to be increased. Further, a reflection bandwidth $\Delta\lambda$ is increased as the refractive index anisotropy $\Delta n$ of the cholesteric liquid crystal is increased.

Patent Document 1: JP-A-2004-219715
Patent Document 2: JP-A-2002-139746

However, in the liquid crystal display element using the cholesteric liquid crystal, when a still picture is displayed for a long time, 'image sticking', which is a phenomenon where a faint outline of a previously displayed image remains visible on the screen when the image is changed, occurs. It is estimated that the image sticking is caused by various factors, such as water, ionic impurities, and the affinity between liquid crystal and a substrate interface. In order to remove the image sticking, a high degree of refining of a material or high stability of an interface state is needed. In addition, for example, as a method of preventing the image sticking, a timer or an optical sensor is provided in a liquid crystal display element to detect a continuous operation time or that the liquid crystal display element is placed in a dark environment, thereby making the entire screen in a standby state (off display). However, in this method, it takes time for the screen to return from the standby state (redisplay). Therefore, when it is necessary to rapidly view a display image, the convenience of the liquid crystal display element significantly deteriorates.

In general, as an environmental temperature is increased, the degree of image sticking is increased. Therefore, Patent Document 1 discloses a method of preventing image sticking by displaying an image sticking prevention pattern causing the entire screen to be black to change liquid crystal to a focal conic state when a temperature sensor detects a temperature that is equal to or higher than a predetermined value. However, when the image sticking prevention pattern is displayed on the display screen, a previously displayed image is temporarily removed. Therefore, the convenience of a display element significantly deteriorates.

Patent Document 2 discloses a method of reducing power consumption by dividing a common electrode into segment electrodes for each digit in 7-segment monochrome display. In addition, Patent Document 2 discloses a structure that initializes a display element in order to prevent image sticking. However, Patent Document 2 discloses only the 7-segment monochrome display, but does not disclose a dot matrix display element capable of performing color display.

SUMMARY OF THE INVENTION

An object of the invention is to provide a display element capable of obtaining a display image with good display quality and improving user convenience, an electronic paper using the same, an electronic terminal apparatus using the same, and a display system using the same.

Another object of the invention is to provide a method of processing an image in a display element capable of obtaining a display image with good display quality and improving user convenience.

The above-described object is achieved by a display element including a first display unit that has a first display region, a second display unit that is laminated on the first display unit and has a second display region arranged so as to correspond to the first display region, and a display control unit that performs a reset process of changing the display region to the same display state on the first display unit and starts the reset process of the second display unit.

The above invention is characterized in that each of the first and second display units includes a plurality of scanning electrodes, a plurality of data electrodes that are arranged so as to intersect the plurality of scanning electrodes, and a plurality of pixels that are formed at intersections of the plurality of scanning electrodes and the plurality of data electrodes and are arranged in a matrix, and the display control unit performs the reset process on the first or second display unit such that the plurality of scanning electrodes are simultaneously selected.

The above invention is characterized in that the display control unit performs the reset process on the first or second display unit such that a voltage pulse having substantially the same waveform is simultaneously applied to the plurality of pixels.

The above invention is characterized in that the display control unit starts a write process of writing image data to the first display region after the reset process of the first display unit ends, and starts the reset process of the second display unit after the write process ends.

The above invention is characterized in that the element further comprises a third display unit that is laminated on the first and second display units, each having a light reflection state, a light transmission state, or an intermediate state therebetween, reflecting different color light components, includes a third display region arranged so as to correspond to the first and second display regions, has the light reflection state, the light transmission state, or the intermediate state therebetween, and reflects a light component having a color that is different from those of the light components reflected by the first and second display units.

The above invention is characterized in that the display control unit performs the reset process on one of the first to third display units reflecting a color closest to the color of a display image, independently from the other display units.

The above invention is characterized in that the element further comprises a detecting unit that detects the start time of the reset process.

The above invention is characterized in that the detecting unit includes a measuring unit that measures a time interval capable of preventing image sticking of the display region.

The above invention is characterized in that the detecting unit includes a light detecting unit that detects the illuminance of an external environment.

The above invention is characterized in that when the illuminance detected by the light detecting unit is less than a predetermined value, the display control unit starts the reset process of the first display unit.

The above invention is characterized in that the first to third display units each have a memory property.

The above invention is characterized in that each of the first to third display units includes a pair of substrates that are arranged so as to face each other, and liquid crystal that is sealed between the substrates and forms a cholesteric phase.

The above invention is characterized in that a DDS driving method is used for the reset process and the write process.

The above invention is characterized in that the first and second display regions are display segments of a segment display type.

The above-described object is achieved by an electronic paper characterized in that it includes a display element according to the above invention.

The above-described object is achieved by an electronic terminal apparatus for displaying an image characterized in that it includes the electronic paper according to the above invention.

The above-described object is achieved by a display system for displaying an image characterized in that it includes the electronic terminal apparatus according to the above invention.

The above-described object is achieved by a method of processing an image in a display element that drives a first display unit having a first display region and a second display unit laminated on the first display unit and having a second display region arranged so as to correspond to the first display region to display an image, the method including the steps of performing a reset process of changing the display region to the same display state on the first display unit and starting the reset process of the second display unit.

The above invention is characterized in that the reset process is performed on the first or second display unit such that a plurality of scanning electrodes are simultaneously selected.

The above invention is characterized in that the reset process is performed on the first or second display unit such that a voltage pulse having substantially the same waveform is simultaneously applied to a plurality of pixels that are formed at intersections of the plurality of scanning electrodes and a plurality of data electrodes arranged so as to intersect the plurality of scanning electrodes and are arranged in a matrix.

The above invention is characterized in that it further comprises starting a write process of writing image data to the first display region after the reset process of the first display unit ends, and starting the reset process of the second display unit after the write process ends.

The above invention is characterized in that the first display unit, the second display unit, and a third display unit that is laminated on the first and second display units and has a third display region reflect different color light components, and the reset process is performed on one of the first to third display units reflecting a color closest to the color of a display image, independently from the other display units.

The above invention is characterized in that wherein the reset process is performed at a time interval capable of preventing image sticking of the display region.

The above invention is characterized in that wherein, when the illuminance of an external environment is less than a predetermined value, the reset process of the first display unit starts.

The above invention is characterized in that a DDS driving method is used to perform the reset process and the write process.

According to the invention, it is possible to achieve a display element capable of obtaining a display image with good display quality and improving user convenience, an electronic paper using the same, an electronic terminal apparatus using the same, and a display system using the same.

BRIEF DESCRIPTION OF THE DRAWINGS

FIGS. 6A to 6D are diagrams schematically illustrating a display unit 6 when a refresh process is performed using the method of processing an image in the display element according to the first embodiment of the invention;

DESCRIPTION OF THE PREFERRED EMBODIMENTS

[First Embodiment]

Figure 1:
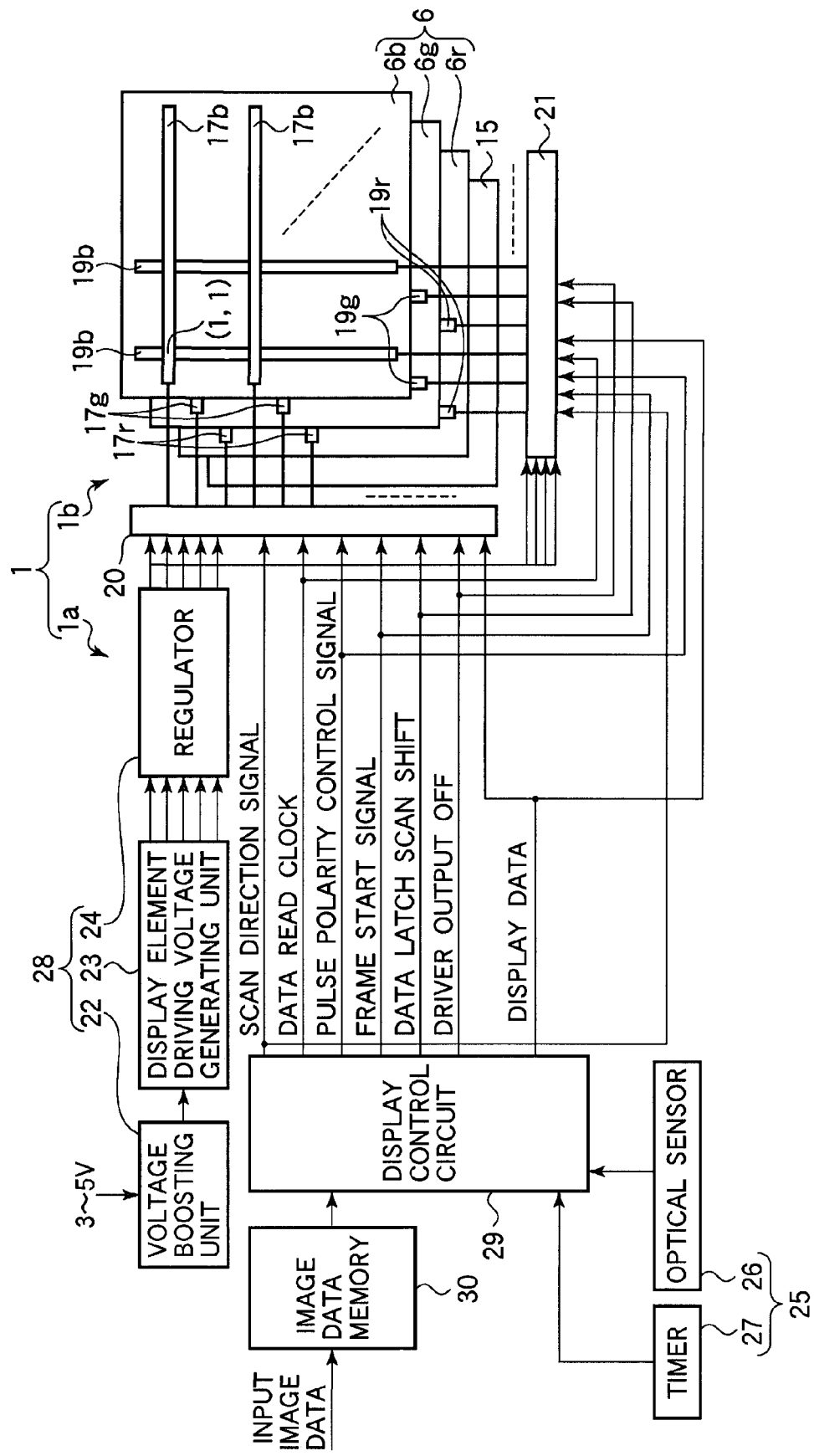
FIG. 1 is a diagram illustrating the schematic structure of a liquid crystal display element 1, which is a display element according to a first embodiment of the invention.
Figure 2:
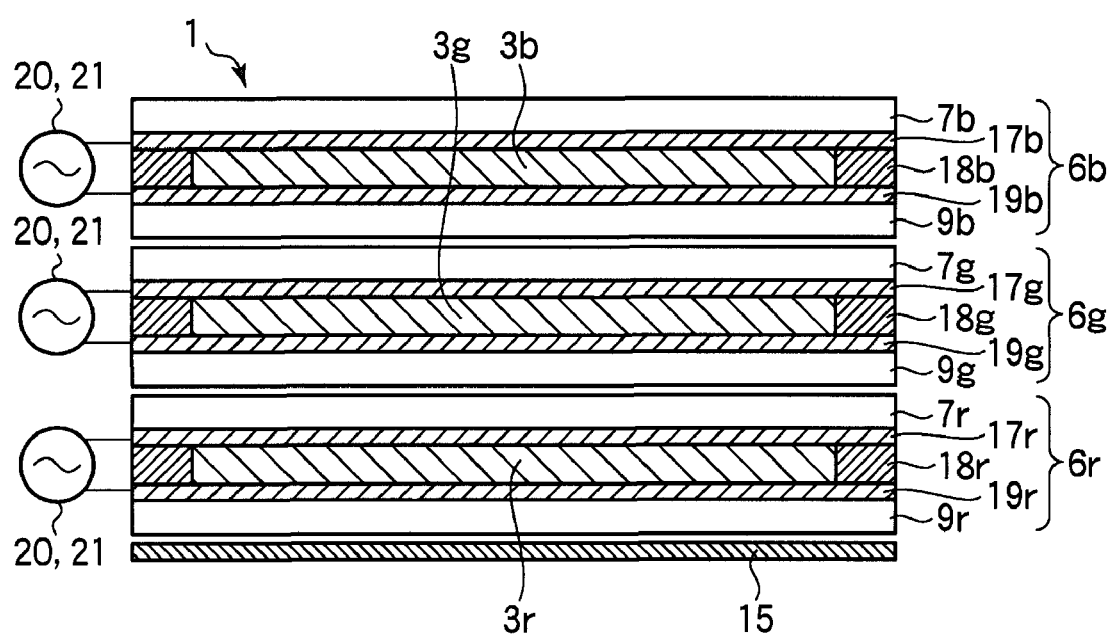
FIG. 2 is a cross-sectional view schematically illustrating the structure of the liquid crystal display element 1, which is the display element according to the first embodiment of the invention.

A display element, an electronic paper using the same, an electronic terminal apparatus using the same, a display system using the same, and a method of processing an image in a display element according to a first embodiment of the invention will be described with reference to FIGS. 1 to 8. In this embodiment, a liquid crystal display element 1 using cholesteric liquid crystal for blue (B), green (G), and red (R) is given as an example of the display element. First, the schematic structure of the liquid crystal display element 1 according to this embodiment will be described with reference to FIGS. 1 to 4. FIG. 1 is a diagram illustrating an example of the schematic structure of the liquid crystal display element 1 according to this embodiment. FIG. 2 is a cross-sectional view schematically illustrating the structure of the liquid crystal display element 1 taken along a straight line parallel to the horizontal direction of FIG. 1.

Depicted as FIGS. 1 and 2, the liquid crystal display element 1 includes a circuit block 1a and a display block 1b. The display block 1b includes a display unit 6. The display unit 6 includes a B display unit 6b that includes a B display region having a B liquid crystal layer 3b which reflects blue light in a planar state, a G display unit 6g that includes a G display region having a G liquid crystal layer 3g which reflects green light in a planar state, and an R display unit 6r that includes an R display region having an R liquid crystal layer 3r which reflects red light in a planar state. The B, G, and R display units 6b, 6g, and 6r are laminated in this order from a light incident surface (display surface) with the B, G, and R display regions facing each other. In addition, the display block 1b includes a scanning electrode driving circuit 20 and a data electrode driving circuit 21 that drive the display unit 6.

The circuit block 1a includes a power supply 28 that converts a DC voltage of 3 to 5 V input from a system (not depicted) into a DC voltage required to drive the display block 1b. In addition, the circuit block 1a includes a display control circuit (display control unit) 29 that performs a reset process of changing the display region to the same display state on any one of the R, G, and B display units 6r, 6g, and 6b and then starts the reset process of the other display units, or generates a predetermined control signal for displaying an image on the display unit 6. The circuit block 1a further includes an image data memory 30 that stores input image data input from the system and a detecting unit 25 that detects the start time of the reset process of the display unit 6.

The power supply 28 includes a voltage boosting unit 22, a display element driving voltage generating unit 23, and a regulator 24. The voltage boosting unit 22 includes, for example, a DC-DC converter, and boosts a DC input voltage of 3 to 5 V input from the system into a DC voltage of about 30 to 40 V required to drive the display unit 6. The display element driving voltage generating unit 23 generates voltages having a plurality of levels corresponding to the grayscale value of each pixel or the selection/non-selection of the pixel, using the voltage boosted by the voltage boosting unit 22 and the input voltage. The regulator 24 includes, for example, a Zener diode and an operational amplifier and so on. The regulator 24 stabilizes the voltage generated by the display element driving voltage generating unit 23 and supplies the voltage to the scanning electrode driving circuit 20 and the data electrode driving circuit 21 in the display block 1b.

The detecting unit 25 includes a timer (measuring unit) 27 and an optical sensor (light detecting unit) 26. The timer 27 is used to measure a time interval capable of preventing the image sticking of the display region of the display unit 6. The optical sensor 26 detects the illuminance of an external environment in which the display element 1 is placed. The detecting unit 25 outputs temporal data measured by the timer 27 and illuminance data detected by the optical sensor 26 to the display control circuit 29.

The display control circuit 29 outputs a control signal for starting the reset process of the display unit 6 to the scanning electrode driving circuit 20 and the data electrode driving circuit 21, using the temporal data and the illuminance data output from the detecting unit 25, which will be described in detail below. In addition, the display control circuit 29 generates driving data on the basis of predetermined driving waveform data and image data of each of the R, G, and B display units 6r, 6g, and 6b read from the image data memory 30. The display control circuit 29 outputs the generated driving data to the scanning electrode driving circuit 20 and the data electrode driving circuit 21, in synchronization with a data read clock. Further, the display control circuit 29 outputs control signals, such as a scan direction signal, a pulse polarity control signal, a frame start signal, a data latch scan shift signal, and a driver output-off signal, to the two circuits 20 and 21.

Next, the structure of the display block 1b will be described in more detail. Depicted as FIGS. 1 and 2, the B display unit 6b of the display block 1b includes a pair of upper and lower substrates 7b and 9b that are arranged so as to face each other and the B liquid crystal layer 3b sealed between the two substrates 7b and 9b. The B liquid crystal layer 3b includes B cholesteric liquid crystal having an average refractive index n and a helical pitch p that are adjusted so as to selectively reflect blue light.

The G display unit 6g includes a pair of upper and lower substrates 7g and 9g that are arranged so as to face each other and the G liquid crystal layer 3g sealed between the two substrates 7g and 9g. The G liquid crystal layer 3g includes G cholesteric liquid crystal having an average refractive index n and a helical pitch p that are adjusted so as to selectively reflect green light.

The R display unit 6r includes a pair of upper and lower substrates 7r and 9r that are arranged so as to face each other and the R liquid crystal layer 3r sealed between the two substrates 7r and 9r. The R liquid crystal layer 3r includes R cholesteric liquid crystal having an average refractive index n and a helical pitch p that are adjusted so as to selectively reflect red light.

A liquid crystal composition of each of the B, G, and R liquid crystal layers 3b, 3g, and 3r is cholesteric liquid crystal obtained by adding 10 to 40 wt % of chiral material to a nematic liquid crystal mixture. The additive rate of the chiral material is a value when the sum of the amount of nematic liquid crystal component and the amount of chiral material is 100 wt %. Various known kinds of nematic liquid crystal may be used, and it is preferable that the cholesteric liquid crystal composition have a dielectric anisotropy $\Delta\in$ in the range of 20 to 50. If the dielectric anisotropy $\Delta\in$ is equal to or more than 20, the range of available chiral material is widened. If the dielectric anisotropy $\Delta\in$ is less than the above-mentioned range, the driving voltages of the liquid crystal layers 3b, 3g, and 3r are increased. On the other hand, if the dielectric anisotropy $\Delta\in$ is significantly more than the above-mentioned range, the stability and reliability of the liquid crystal display element 1 are lowered, and an image defect or image noise is likely to occur.

The refractive index anisotropy $\Delta n$ of the cholesteric liquid crystal is an important physical property that dominates image quality. It is preferable that the refractive index anisotropy Δn be in the range of 0.18 to 0.24. If the refractive index anisotropy Δn is less than the above-mentioned range, the reflectance of each of the liquid crystal layers 3b, 3g, and 3r in a planar state is lowered. As a result, brightness is lowered, and a dark image is displayed. On the other hand, if the refractive index anisotropy Δn is more than the above-mentioned range, the diffuse reflection of each of the liquid crystal layers 3b, 3g, and 3r in a focal conic state is increased. As a result, the color purity and contrast of a display screen are insufficient, and a dim image is displayed. If the refractive index anisotropy Δn is more than the above-mentioned range, the viscosity of the cholesteric liquid crystal increases. Therefore, the response speed of the cholesteric liquid crystal is lowered.

It is preferable that the cholesteric liquid crystal have a specific resistance ρ in the range of $10^{10}$ to $10^{13}$ (Ω·cm). In addition, it is preferable that the cholesteric liquid crystal have low viscosity in order to prevent a reduction in contrast and an increase in voltage at a low temperature.

Figure 13:
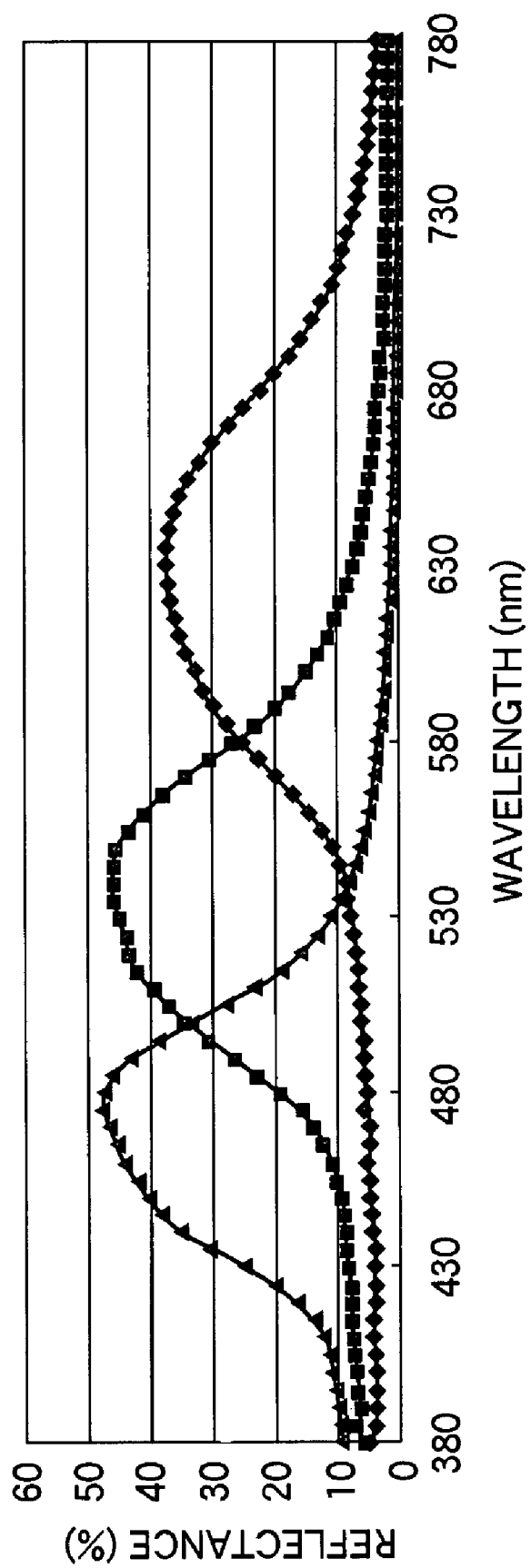
FIG. 13 is a diagram illustrating an example of the reflection spectrum of the liquid crystal display element in a planar state according to the related art.

In the laminated structure of the B, G, and R display units 6b, 6g, and 6r, the optical rotatory power of the G liquid crystal layer 3g in a planar state is different from those of the B and R liquid crystal layers 3b and 3r. Therefore, in a region in which the reflection spectrums of blue and green and the reflection spectrums of green and red overlap each other in FIG. 13, the B liquid crystal layer 3b can reflect right-handed circularly polarized light, and the G liquid crystal layer 3g can reflect left-handed circularly polarized light. In this way, it is possible to reduce the loss of reflected light and improve the brightness of a display screen of the liquid crystal display element 1.

The upper substrates 7b, 7g, and 7r and the lower substrates 9b, 9g, and 9r need to be translucent. In this embodiment, two glass substrates are used. In addition, instead of the glass substrate, a film substrate made of, for example, polycarbonate (PC) or poly ethylene terephthalate (PET) may be used. In this embodiment, all of the upper substrates 7b, 7g, and 7r and the lower substrates 9b, 9g, and 9r have translucency. However, the lower substrate 9r of the R display unit 6r arranged at the lowest side may be opaque.

A plurality of strip-shaped data electrodes 19b are formed in parallel to each other on a surface of the lower substrate 9b facing the B liquid crystal layer 3b in the B display unit 6b so as to extend in the vertical direction of FIG. 1. In addition, a plurality of strip-shaped scanning electrodes 17b are formed in parallel to each other on a surface of the upper substrate 7b facing the B liquid crystal layer 3b so as to extend in the horizontal direction of FIG. 1. In this embodiment, a transparent electrode made of indium tin oxide (ITO) is patterned to form a plurality of strip-shaped scanning electrodes 17b and a plurality of strip-shaped data electrodes 19b. For example, ITO is generally used to form the electrodes 17b and 19b. However, a transparent conductive film made of, for example, indium zinc oxide (IZO) or an optical conductive film made of, for example, amorphous silicon may be used to form the electrodes.

Depicted as FIG. 1, the electrodes 17b and 19b intersect each other while facing each other, when viewing the electrode-formed surfaces of the upper and lower substrates 7b and 9b in the normal direction. The intersections of the electrodes 17b and 19b serve as pixels. A plurality of pixels are partitioned by the electrodes 17b and 19b so as to be arranged in a matrix, thereby forming the display screen. In FIG. 2, reference numerals 17b and 19b denote regions in which the electrodes 17b and 19b are formed, but the shapes of the electrodes are not depicted as FIG. 2.

It is preferable that an insulating thin film (not depicted) or a film for stabilizing the alignment of liquid crystal molecules (not depicted) be coated as a function film on each of the electrodes 17b and 19b. The insulating thin film has a function of preventing a short circuit between the electrodes 17b and 19b or serves as a gas barrier to improve the reliability of the liquid crystal display element 1. The alignment stabilizing film may be formed of, for example, a polyimide resin or an acrylic resin. In this embodiment, for example, the alignment stabilizing film is formed (coated) on the entire surface each of the substrates having the electrodes 17b and 19b formed thereon. The alignment stabilizing film may also serve as the insulating thin film.

The B liquid crystal layer 3b is sealed between the two substrates 7b and 9b by a sealing material 18b that is applied at the edges of the upper and lower substrates 7b and 9b. In addition, the thickness (cell gap) of the B liquid crystal layer 3b needs to be kept uniform. In order to maintain a predetermined cell gap, a plurality of spherical spacers made of resin or an inorganic oxide are dispersed in the B liquid crystal layer 3b, or a plurality of columnar spacers having thermoplastic resin coated on the surfaces thereof are formed in the B liquid crystal layer 3b. In the liquid crystal display element 1 according to this embodiment, spacers (not depicted) are inserted into the B liquid crystal layer 3b to maintain a uniform cell gap. It is preferable that the cell gap d of the B liquid crystal layer 3b be in the range of 3 μm to 6 μm.

Since the G display unit 6g and the R display unit 6r have the same structure as the B display unit 6b, a description thereof will be omitted. A visible light absorbing layer 15 is provided on the outer surface (rear surface) of the lower substrate 9r of the R display unit 6r. Therefore, when all of the B, G, and R liquid crystal layers 3b, 3g, and 3r are in the focal conic state, black is displayed on the display screen of the liquid crystal display apparatus 1. The visible light absorbing layer 15 may not be provided, if necessary.

The scanning electrode driving circuit 20 having a scanning electrode driver IC for individually driving a plurality of scanning electrodes 17b, 17g, and 17r mounted thereon is connected to the upper substrates 7b, 7g, and 7r. In addition, the data electrode driving circuit 21 having a data electrode driver IC for individually driving a plurality of data electrodes 19b, 19g, and 19r mounted thereon is connected to the lower substrates 9b, 9g, and 9r. These driving circuits 20 and 21 output pulse scanning signals and pulse data signals to predetermined scanning electrodes 17b, 17g, and 17r and predetermined data electrodes 19b, 19g, and 19r, on the basis of predetermined signals output from the display control circuit 29, respectively.

An input/output device (not depicted) and a control device (not depicted) that controls the overall operation of the liquid crystal display element are provided in the liquid crystal display element 1 depicted as FIG. 1 to form an electronic paper. The electronic paper can be used as a display element of an electronic terminal apparatus. The electronic terminal apparatus can be used as a display apparatus of a display system.

Figure 3A:
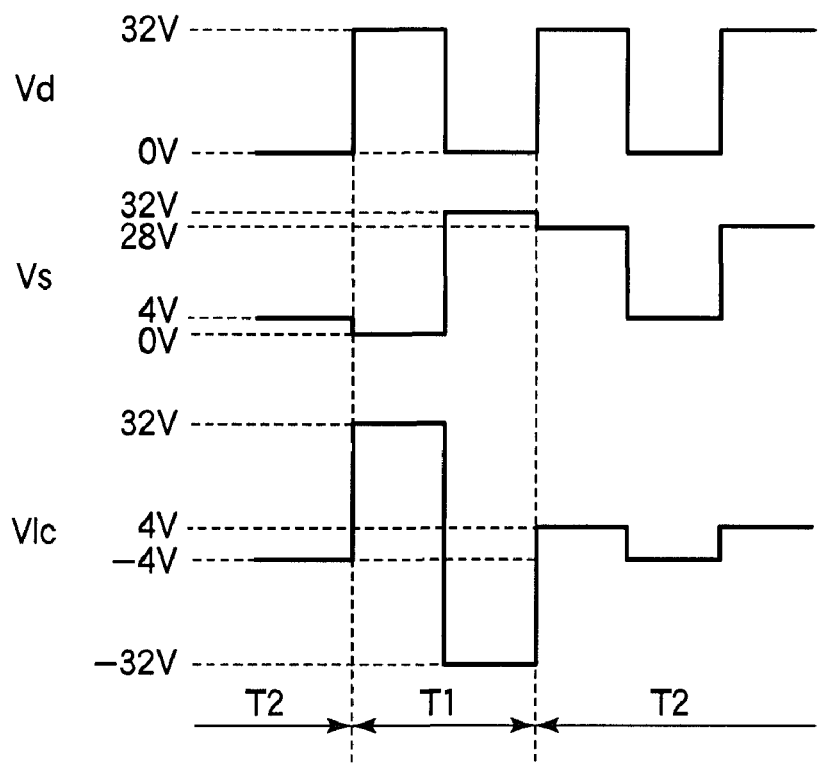
FIGS. 3A and 3B are diagrams illustrating an example of the driving waveforms of the liquid crystal display element 1, which is the display element according to the first embodiment of the invention.
Figure 3B:
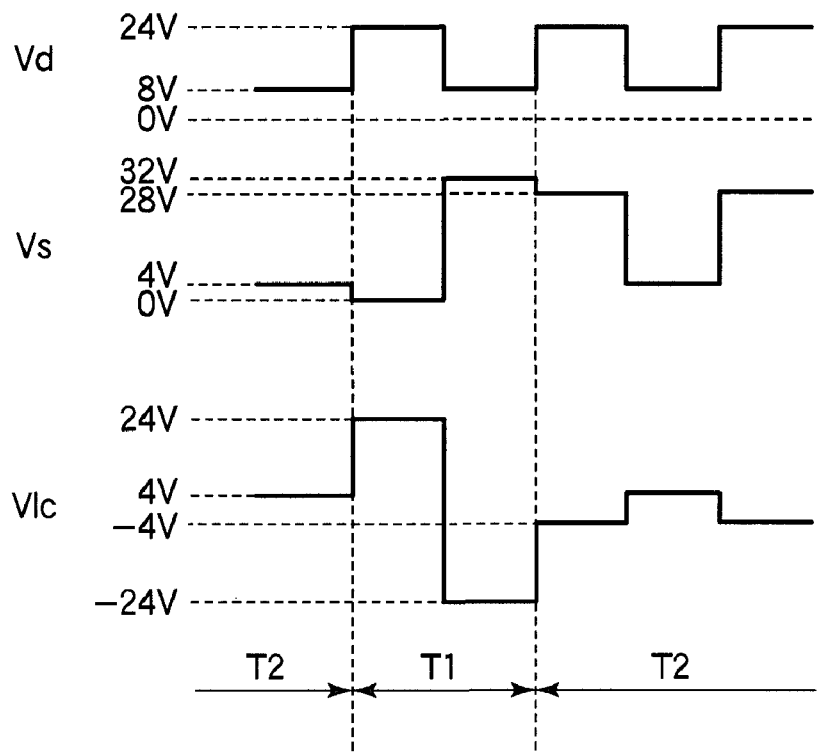

Next, a method of driving the liquid crystal display element 1 will be described with reference to FIGS. 3A, 3B, and 4. FIGS. 3A and 3B are diagrams illustrating an example of the driving waveforms of driving data of the liquid crystal display element 1. FIG. 3A depicts driving waveforms for driving cholesteric liquid crystal in a planar state, and FIG. 3B depicts driving waveforms for driving cholesteric liquid crystal in a focal conic state. In FIGS. 3A and 3B, an upper part depicts the waveform of a data signal voltage Vd output from the data electrode driving circuit 20, a middle part depicts the waveform of a scanning signal voltage Vs output from the scanning electrode driving circuit 21, and a lower part depicts the waveform of a liquid crystal application voltage Vlc applied to the pixels of each of the B, G, and R liquid crystal layers 3b, 3g, and 3r. In addition, in FIGS. 3A and 3B, the horizontal direction indicates the time elapsed and the vertical direction indicates a voltage.

Figure 4:
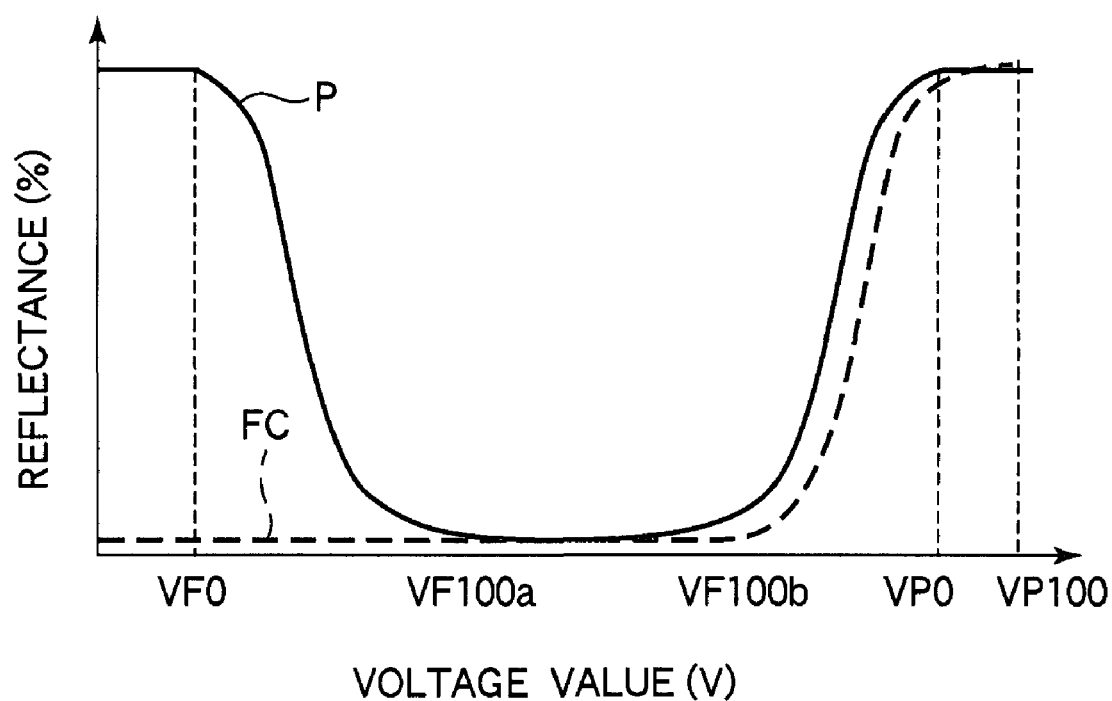
FIG. 4 is a diagram illustrating an example of the voltage-reflectance characteristics of a liquid crystal composition of the liquid crystal display element 1, which is the display element according to the first embodiment of the invention.

FIG. 4 depicts an example of the voltage-reflectance characteristics of the cholesteric liquid crystal. The horizontal axis indicates a voltage (V) applied to the cholesteric liquid crystal, and the horizontal axis indicates the reflectance (%) of the cholesteric liquid crystal. In FIG. 4, a solid curved line P indicates the voltage-reflectance characteristics of the cholesteric liquid crystal in a planar state, which is an initial state, and a dotted curved line FC indicates the voltage-reflectance characteristics of the cholesteric liquid crystal in a focal conic state, which is an initial state.

A case in which a predetermined voltage is applied to a blue (B) pixel (1, 1) disposed at the intersection of a first data electrode 19b and a first scanning electrode 17b of the B display unit 6b depicted as FIG. 1 will be described. Depicted as FIG. 3A, the data signal voltage Vd is +32 V and the scanning signal voltage Vs is 0 V during about the first half of a selection period T1 for which the first scanning electrode 17b is selected. During about the second half of the selection period T1, the data signal voltage Vd is 0 V and the scanning signal voltage Vs is +32 V. Therefore, a pulse voltage of ±32 V is applied to the B liquid crystal layer 3b of the B pixel (1, 1) during the selection period T1. Depicted as FIG. 4, when a predetermined high voltage VP100 (for example, 32 V) is applied to the cholesteric liquid crystal to generate a strong electric field, the helical structure of the liquid crystal molecule is completely untwisted, and all the liquid crystal molecules are changed to a homeotropic state along the direction of the electric field. Therefore, the liquid crystal molecules of the B liquid crystal layer 3b of the B pixel (1, 1) are in the homeotropic state during the selection period T1.

When the selection period T1 ends and a non-selection period T2 starts, voltages of, for example, +28 V and +4 V are applied to the first scanning electrode 17b with a period corresponding to half the selection period T1. On the other hand, a predetermined data signal voltage Vd is applied to the first data electrode 19b. In FIG. 3A, for example, voltages of +32 V and 0 V are applied to the first data electrode 17b with a period corresponding to half the selection period T1. Therefore, a pulse voltage of ±4 V is applied to the B liquid crystal layer 3b of the B pixel (1, 1) during the non-selection period T2. In this way, during the non-selection period T2, the electric field generated in the B liquid crystal layer 3b of the B pixel (1, 1) is approximately zero.

When the liquid crystal application voltage applied to the liquid crystal molecules in the homeotropic state is changed from VP100 (±32 V) to VF0 (±4 V) and the electric field is rapidly changed to approximately zero, the helical axes of the liquid crystal molecules are aligned in a direction that is substantially vertical to, the two electrodes 17b and 19b, and the liquid crystal molecules are changed to the planar state in which they selectively reflect light corresponding to a helical pitch. Therefore, the B liquid crystal layer 3b of the B pixel (1, 1) is changed to the planar state and reflects light. As a result, the B pixel (1, 1) displays blue.

Depicted as FIG. 3B, during about the first half and the second half of the selection period T1, the data signal voltages Vd are 24 V and 8 V and the scanning signal voltages Vs are 0 V and +32 V, respectively. In this case, a pulse voltage of ±24 V is applied to the B liquid crystal layer 3b of the B pixel (1, 1). Depicted as FIG. 4, when a predetermined low voltage VF100b (for example, 24 V) is applied to the cholesteric liquid crystal to generate a weak electric field, the helical structure of the liquid crystal molecule is not completely untwisted. During the non-selection period T2, voltages of, for example, +28 V and +4 V are applied to the first scanning electrode 17b with a period corresponding to half the selection period T1, and a predetermined data signal voltage Vd (for example, +24 V and 8 V) is applied to the data electrode 19b with a period corresponding to half the selection period T1. Therefore, during the non-selection period T2, pulse voltages of −4 V and +4 V are applied to the B liquid crystal layer 3b of the B pixel (1, 1). In this way, during the non-selection period T2, the electric field generated in the B liquid crystal layer 3b of the B pixel (1, 1) is approximately zero.

When the voltage applied to the cholesteric liquid crystal molecules whose helical structures are not completely untwisted is changed from VF100b (±24 V) to VF0 (±4 V) and the electric field is rapidly changed to approximately zero, the helical axes of the liquid crystal molecules are aligned with a direction that is substantially horizontal with respect to the two electrodes 17b and 19b, and the liquid crystal molecules are changed to the focal conic state in which they transmit incident light. Therefore, the B liquid crystal layer 3b of the B pixel (1, 1) is changed to the focal conic state to transmit light. Depicted as FIG. 4, it is also possible to change the cholesteric liquid crystal to the focal conic state by applying the voltage VP100 (±32 V) to generate a strong electric field in the liquid crystal layer and slowly removing the electric field.

The above-mentioned driving voltages are just an example. When a pulse voltage of 30 to 35 V is applied between the two electrodes 17b and 19b for an effective time of 20 ms at a room temperature, the cholesteric liquid crystal of the B liquid crystal layer 3b is changed to a selective reflection state (planar state). When a pulse voltage of 15 to 22 V is applied therebetween for an effective time of 20 ms, the cholesteric liquid crystal is changed to a good transmission state (focal conic state).

The green (G) pixel (1, 1) and the red (R) pixel (1, 1) arranged to correspond to the B pixel (1, 1) can be driven by the same method as that for driving the B pixel (1, 1) to display a color image on a pixel (1, 1), which is a laminate of three B, G, and R pixels (1, 1). In addition, the first to n-th scanning electrodes 17b, 17g, and 17r are driven by a so-called line sequential driving method to rewrite the data voltages of the data electrodes 19 to the scanning electrodes. In this way, it is possible to output display data to all the pixels from the pixel (1, 1) to the pixel (n, m) to display one frame (display screen) of color image. In addition, when an intermediate electric field is applied to the cholesteric liquid crystal and the electric field is rapidly removed, the cholesteric liquid crystal is changed to an intermediate state between the planar state and the focal conic state. Therefore, it is possible to display a full color image.

Next, a method of processing an image in a display element according to this embodiment will be described with reference to FIG. 1 and FIGS. 5 to 8. In the method of processing an image in a display element according to this embodiment, a reset process of changing a display region to the same display state is performed on a first display unit including a first display region, and the reset process is then performed on a second display unit having a second display region that is laminated on the first display unit. In addition, in the method of processing an image in a display element according to this embodiment, after the reset process of the first display region is completed, a write process of writing image data to the first display region starts. After the write process is completed, the reset process of the second display region starts. In this way, it is possible to perform a rewrite process of the display unit while maintaining the visibility of a display element as high as possible. The 'rewrite process' means a series of processes for performing the reset process of changing the display region to a specific display state on the display unit and performing the write process of writing image data to the display unit subjected to the reset process. In the following description, a process of performing rewriting on all the display units of the display element is referred to as a refresh process.

In the case of cholesteric liquid crystal, after the reset process of changing the cholesteric liquid crystal to a homeotropic state as a specific display state is performed, image data is written. In this way, it is possible to minimize a reduction in the visibility of a display element in a standby state or an initial state.

Further, in this embodiment, the reset process is performed at a time interval capable of preventing the image sticking of the display region of the display unit. In this way, it is possible to effectively prevent the image sticking of the display element and maintain a good display state.

Figure 5:
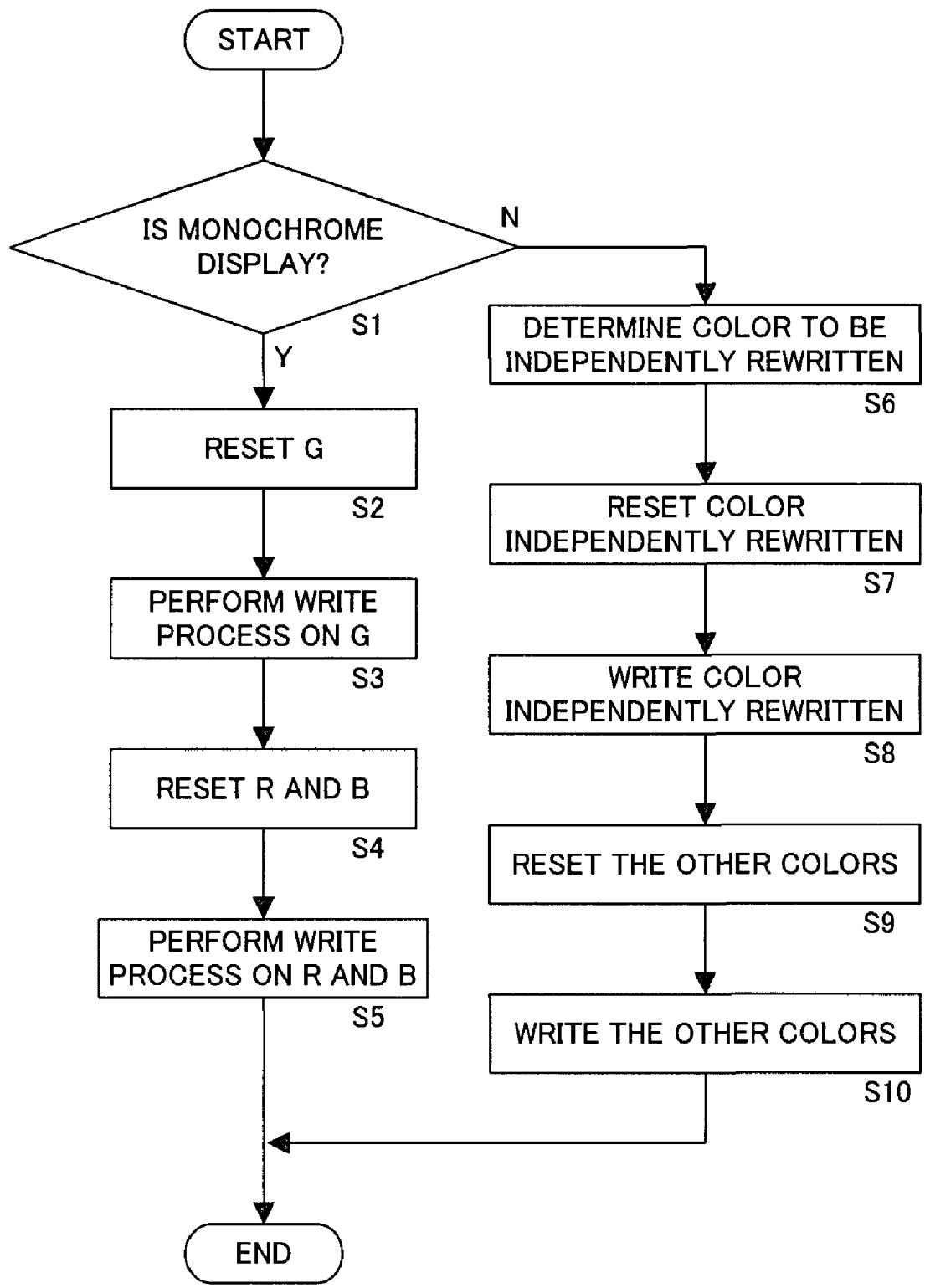
FIG. 5 is a flowchart illustrating a method of processing an image in the display element according to the first embodiment of the invention.

Next, the method of processing an image in a display element according to this embodiment will be described in detail using the liquid crystal display element 1 depicted as FIG. 1 as an example. FIG. 5 is a flowchart illustrating the method of processing an image in a display element according to this embodiment. FIGS. 6A to 6D are diagrams schematically illustrating the display unit 6 when the refresh process is performed by the method of processing an image in a display element according to this embodiment. FIG. 6A depicts the display unit 6 before the refresh process starts and after the refresh process ends. FIGS. 6B and 6D depict the display unit 6 when the reset process ends, and FIG. 6C depicts the display unit 6 when the write process ends. In FIGS. 6A to FIG. 6D, an upper part schematically depicts the cross section of the display unit 6, and a lower part depicts an image displayed by the display unit 6. In the upper parts of FIGS. 6A to 6D, the display unit reflects or transmits incident light L in a normal display state, and the display unit transmits the light L without reflecting it after the reset process.

Next, an example in which the method of processing an image in a display element is applied to a display image having a red circle r, a green triangle g, and a blue rectangle b arranged on a background having a white upper half and a gray lower half depicted as FIG. 6A will be described. The circle r is arranged in the white region of the background, the triangle g is arranged so as to be laid across the white and gray regions of the background, and the rectangle b is arranged in the gray region of the background. In this embodiment, the order or combinations of the display units that perform the reset process are changed according to the entire color of the display image such that the visibility of the display image is maintained during the reset process. The entire color of the display image may be determined on the basis of, for example, the average of the pixel values (grayscale values) of RGB image data. Alternatively, a display image displayed at the center of the screen may be extracted, and the entire color of the display image may be determined on the basis of the extracted display image. The entire color of the display image is determined by the display control circuit 29.

In the method of processing an image in a display element according to this embodiment, depicted as FIG. 5, first, it is determined whether a display image is a monochrome image (Step S1). In Step S1, image data written to the pixels that are arranged so as to correspond to each other in the display regions of the R, G, and B display units 6*r*, 6*g*, and 6*b* are compared. As the result of the comparison, if the image data written to the pixels that are arranged so as to correspond to each other among all the pixels are identical to each other, it is determined that the display image is a monochrome image. Depicted as FIG. 1, for example, the B pixel (1, 1), and the G pixel (1, 1) (not depicted) and the R pixel (1, 1) (not depicted) that are arranged immediately below the B pixel (1, 1) have the same image data. Similarly, when the B pixels (1, 2) to (n, m), the G pixels (1, 2) to (n, m), and the R pixels (1, 2) to (n, m) have the same image data, it is determined that a display image is a monochrome image. In this embodiment, depicted as FIG. 6A, since color display is performed, it is determined that the display image is not a monochrome image (Step S1: N).

Then, a color to be subjected to an independent rewrite process is determined (Step S6). In Step S6, for example, the display control circuit 29 reads R, G, and B image data from the image data memory 30, and calculates the average of the grayscale values of the pixels of each of the R, G, and B display images. Then, the display control circuit 29 determines that a color having the largest average of the grayscale values is closest to the entire color of the display image. Depicted as FIG. 6A, in this embodiment, since the triangle g is larger than the circle r and the rectangle b, green has the average of grayscale data that is larger than those of the other colors. Therefore, the display control circuit 29 determines that the display image has a green-based color.

Then, depicted as FIG. 5, the reset process is performed on the display unit that reflects a color closest to the color of the display image independently from the other display units (Step S7). In this embodiment, the reset process is independently performed on the G display unit 6*g* serving as a first display unit. In Step S7, for example, a voltage of ±32 V is simultaneously applied to all the pixels such that the G liquid crystal layer 3*g* in the display region (first display region) of the G display unit 6*g* is changed to, for example, a homeotropic state. Specifically, the display control circuit 29 outputs a predetermined control signal for simultaneously selecting all the scanning electrodes 17*g* of the G display unit 6*g* to the scanning electrode driving circuit 20 such that a voltage pulse having a substantially uniform waveform is applied to all the pixels of the G display unit 6*g*. At the same time, the display control circuit 29 outputs a predetermined control signal to the data electrode driving circuit 21 such that all the data electrodes 19*g* of the G display unit 6*g* are simultaneously selected. In this way, the driving circuits 20 and 21 apply, for example, the scanning signal voltage Vs and the data signal voltage Vd of the selection period T1 depicted as FIG. 3A to all the scanning electrodes 17*g* and all the data electrodes 19*g*, respectively, and the voltage pulse of the liquid crystal application voltage Vlc is applied to all the pixels of the G display unit 6*g*.

Depicted as the upper part of FIG. 6B, the G display unit 6*g* is changed to a homeotropic state and transmits the light L. On the other hand, the R and B display units 6*r* and 6*b* are maintained in a normal display state in which they reflect or transmit the light L. In this way, depicted as the lower part of FIG. 6B, the liquid crystal display element 1 displays a black triangle g, a red circle r, and a blue rectangle b which are the same as those in the normal display, and the background including a magenta (complementary color of green) upper half and a halftone magenta lower half. As such, the liquid crystal display apparatus 1 can maintain the display of an image having a color that is different from that in the normal display during the reset process such that information of the image can be sufficiently recognized during the normal display.

Then, depicted as FIG. 5, after the reset process of the G display unit 6g ends, a write process of writing image data to the display region of the G display unit 6g starts (Step S8). The display control circuit 29 controls the scanning electrode driving circuit 20 and the data electrode driving circuit 21 to supply driving data to the G display unit 6g, similar to a general write process. In this way, depicted as FIG. 6C, the liquid crystal display element 1 displays a general image. The rewrite process of the G display unit 6g, which is the first display unit, is completed by Steps S7 and S8.

Then, depicted as FIG. 5, the reset process of the R and B display units 6r and 6b, which are the second and third display units, starts (Step S9). The same reset process as that performed on the G display unit 6g is performed on the R and B display units 6r and 6b. Depicted as the upper part of FIG. 6D, the R and B display units 6r and 6b are changed to the homeotropic state and transmit the light L. On the other hand, the G display unit 6g is maintained in the normal display state that reflects or transmits the light L. In this way, depicted as the lower part of FIG. 6D, the liquid crystal display element 1 displays a black circle r, a black rectangle b, a green triangle g that is the same as that in the normal display, and a background having a green upper half and a halftone green lower half. Depicted as FIG. 6D, when the reset process of the R and B display units 6r and 6b is completed, it is difficult to recognize a portion of the triangle g arranged on the upper half of the background since the triangle g and the upper half of the background have the same color, and the triangle g is viewed as a trapezoid. As such, in the simple display image depicted as FIGS. 6A to 6D, the image is likely to be viewed as a different image by the reset process. However, actually, since a display image is complicated, this problem hardly arises. Therefore, the liquid crystal display apparatus 1 can maintain the display of an image such that information of the image can be sufficiently recognized during the reset process.

Then, depicted as FIG. 5, after the reset process of the R and B display units 6r and 6b ends, the write process of the R and B display unit 6r and 6b starts (Step S10). The display control circuit 29 controls the scanning electrode driving circuit 20 and the data electrode driving circuit 21 to supply driving data to the R and B display units 6r and 6b, similar to a general write process. In this way, depicted as FIG. 6A, the liquid crystal display element 1 displays a general image. The rewrite process of the R and B display units 6r and 6b is completed, and the refresh process of the display unit 6 is completed by Steps S9 and S10.

In this embodiment, it is assumed that the entire color of an image is a green-based color. When the color is a blue-based color, in Steps S7 and S8, the rewrite process of the B display unit 6b, serving as the first display unit, is performed independently from the other color display units. When the color is a red-based color, in Steps S7 and S8, the rewrite process of the R display unit 6r, which is the first display unit, is performed independently from the other color display units. Then, in Steps S9 and S10, the rewrite process is performed on the other display units, serving as the second and third display units, which reflect the other colors.

Depicted as FIG. 5, if it is determined in Step S1 that the display image is a monochrome image (Step S1: Y), the reset process is performed on the G display unit 6g, serving as the first display unit (Step S2), and then the write process is performed thereon (Step S3). In this way, the rewrite process of the G display unit 6g is completed. Green has the highest luminosity among R, G, and B, and has the largest effect on the viewing of the display image. Therefore, the rewrite process of the G display unit 6g is independently performed. Then, the reset process is performed on the R and B display units 6r and 6b, serving as the second and third display units (Step S4), and then the write process is performed thereon (Step S5). In this way, the rewrite process of the R and B display units 6r and 6b ends, and the refresh process of the display unit 6 ends. The processes from Step S2 to Step S5 are the same as those from Step S7 to Step S10, and thus a description thereof will be omitted.

The order of the refresh process is not limited to that depicted as FIG. 5. For example, after Steps S4 and S5 are performed, Steps S2 and S3 may be performed, and after Steps S9 and S10 are performed, Steps S7 and S8 may be performed. When the refresh process of the display unit 6 is performed in this order, the display unit processed in Steps S4 and S5 or Steps S9 and S10 is the first display unit, and the display unit processed in Steps S2 and S3 or Steps S7 and S8 is the second display unit. In addition, in Steps S4 and S5, the R and B display units 6r and 6b may be individually processed without being simultaneously processed. Similarly, in Steps S9 and S10, each of the R, G, and B display units may be independently processed without being simultaneously processed. Further, for example, the rewrite process may be sequentially performed on the R, G, and B display units 6r, 6g, and 6b, without performing Step S6.

Figure 7:
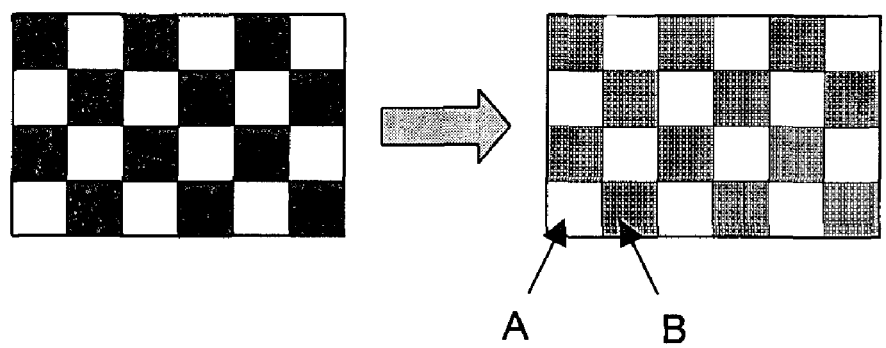
FIG. 7 is a diagram illustrating a method of evaluating the image sticking of a display region in the method of processing an image in the display element according to the first embodiment of the invention.
Figure 8:
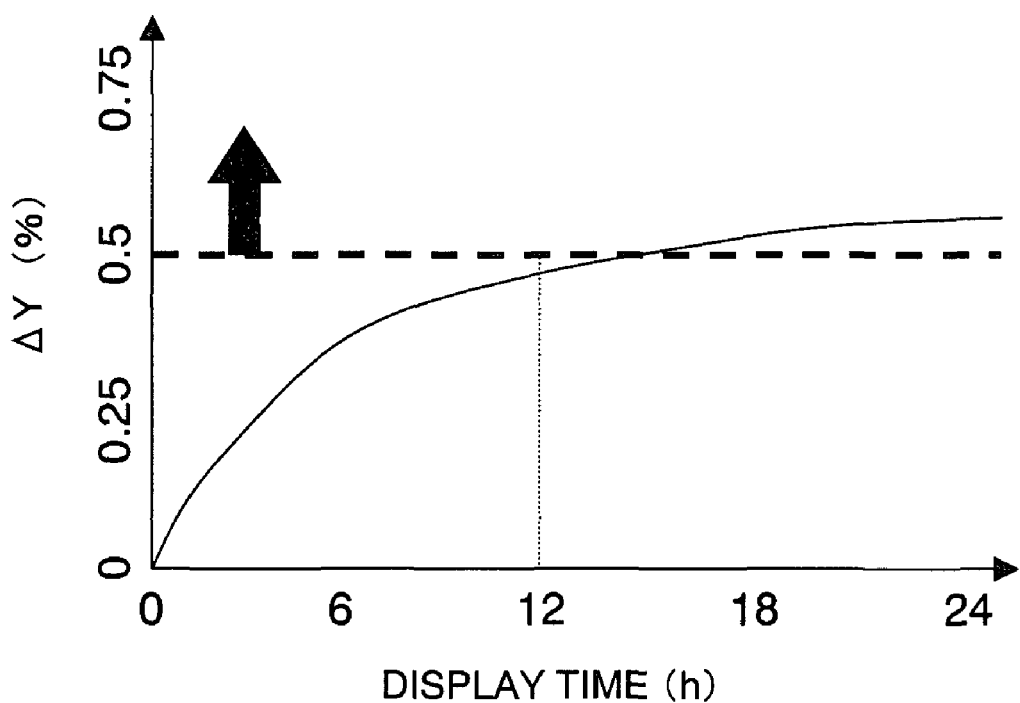
FIG. 8 is a diagram illustrating the method of evaluating the image sticking of the display region in the method of processing an image in the display element according to the first embodiment of the invention.

Next, the time when the refresh process is performed on the display unit 6 of the liquid crystal display element 1 will be described with reference to FIGS. 7 and 8. In this embodiment, the refresh process is performed on the basis of a time interval capable of preventing the image sticking of the pixels in the display region or the illuminance of an external environment in which the liquid crystal display element 1 is placed. FIGS. 7 and 8 are diagrams illustrating a method of evaluating the image sticking of the display region. FIG. 7 depicts an example of the display image when the image sticking is evaluated and after the evaluation. In FIG. 7, the left side depicts the display unit 6 when the image sticking of the pixels is evaluated, and the right side depicts the display unit 6 after the image sticking of the pixels is evaluated. FIG. 8 is a graph illustrating the relationship between the display time of a checkered pattern depicted in FIG. 7 and the degree of image sticking $\Delta Y$. In FIG. 8, the horizontal axis indicates the display time (h) of the checkered pattern, and the vertical axis indicates the degree of image sticking $\Delta Y$. A straight dashed line that extends in the horizontal direction of FIG. 8 indicates the boundary of the viewing limit of image sticking, and a straight dotted line that extends in the vertical direction of FIG. 8 indicates the time interval of the refresh process according to this embodiment. In addition, in FIG. 8, a bold arrow indicates the degree of image sticking $\Delta Y$ capable of viewing the image sticking.

Depicted as FIG. 7, for example, a checkered pattern is displayed on the display unit 6 for a predetermined time, and then white or a predetermined halftone color is displayed on the entire surface of the display unit. Then, even though white or a predetermined halftone color is displayed on the entire surface of the display unit 6, in some cases, the checkered pattern remains as image sticking on the display screen, depicted as the right side of FIG. 7. The degree of image sticking of the display unit 6 is evaluated using $\Delta Y$ as an index. $\Delta Y$ is calculated by subtracting the brightness Yb of a black display region B from the brightness Yw of a white display region A ($\Delta Y = Yw - Yb$). As the degree of image sticking of the display unit 6 is increased, the back display region B becomes darker. Therefore, as the value of Yb decreases, the difference between Yw and Yb increases. Thus, it is possible to determine that, as the value of $\Delta Y$ is increased, the degree of image sticking of a pixel is increased. The graph depicted as FIG. 8 is obtained by repeatedly calculating the value of ΔY at a predetermined time interval over a period from 0 to several days. In addition, for example, a spectrometer manufactured by Otsuka Electronics Co., Ltd. can be used to measure reflectance.

Depicted as FIG. 8, as the display time is increased, the degree of image sticking ΔY of a pixel is increased. As represented by a straight dashed line in FIG. 8, if ΔY≦0.5 (when the value of Y of a standard white board is 100), the degree of image sticking of the display screen is small enough to be ignored. Therefore, in this embodiment, the allowable range of the image sticking of the pixel is set to satisfy ΔY ≦0.5. The characteristics of ΔY with respect to the display time depend on, for example, the liquid crystal material used. In this embodiment, when the same image is displayed for about 13.5 hours, ΔY is more than 0.5, and the image sticking of the display screen is viewed. Therefore, in this embodiment, in order to ensure a predetermined margin for the image sticking of the pixel, the refresh process is performed with a period of 12 hours. In this way, it is possible to reduce the value of ΔY of the liquid crystal display element 1 to be smaller than 0.5. Therefore, it is possible to prevent the image sticking of a display screen and improve display quality. In this embodiment, if the refresh process is performed with a period of 24 hours, ΔY is more than 0.5. Therefore, image sticking occurs in the display screen, and the display quality of the liquid crystal display element 1 deteriorates.

For example, the display control circuit 29 stores a time interval that starts the refresh process for preventing the occurrence of image sticking. If temporal data output from the timer 27 is larger than the time interval, the display control circuit 29 starts the refresh process of the display unit 6 depicted as FIG. 5. When the refresh process of the R, G, and B display units 6*r*, 6*g*, and 6*b* ends, the display control circuit 29 resets the temporal data of the timer 27 and resumes the comparison between temporal data output from the timer 27 and the time interval of the refresh process.

The liquid crystal display element 1 can spontaneously start the refresh process independently from the time interval, on the basis of illuminance data output from the optical sensor 26 of the detecting unit 25. If the illuminance data output from the optical sensor 26 is smaller than a predetermined threshold value, the display control circuit 29 starts the refresh process of the display unit 6 depicted as FIG. 5. When the refresh process of the R, G, and B display units 6*r*, 6*g*, and 6*b* ends, the display control circuit 29 resumes the comparison between the illuminance data output from the optical sensor 26 and the threshold value for starting the refresh process. As such, when the liquid crystal display element 1 is placed in a dark place and the user cannot view the screen, the liquid crystal display element 1 provided with the optical sensor 26 makes it possible for the display control circuit 29 to spontaneously start the refresh process of the display unit 6 without waiting for a period of 12 hours.

In this way, the image sticking of a pixel is prevented, and the convenience of the liquid crystal display element 1 is improved. The threshold value for starting the refresh process is set to, for example, 50 (1x). The liquid crystal display element 1 is a reflective type. Therefore, if the surrounding illuminance is lower than 50 (1x), visibility is significantly lowered. The threshold value is suitable for an index of the spontaneous refresh process.

As described above, according to this embodiment, the liquid crystal display element 1 can perform the refresh process of the display unit 6 while maintaining the visibility of the display screen as high as possible by setting the reset process times of the R, G, and B display units 6*r*, 6*g*, and 6*b* to be different from each other. In addition, the liquid crystal display element 1 performs the refresh process at a time interval capable of preventing the occurrence of image sticking in the display region of the display unit 6. Therefore, it is possible to prevent the image sticking of a display region and obtain good display quality.

[Second Embodiment]

A display element, an electronic paper using the same, an electronic terminal apparatus using the same, a display system using the same, and a method of processing an image in a display element according to a second embodiment of the invention will be described with reference to FIGS. 9A, 9B, and 10. The display element according to this embodiment is characterized in that a reset process and a write process are performed at a high speed. In this embodiment, a liquid crystal display element 1 having the same structure as that according to the first embodiment is given as an example of the display element, and a DDS (dynamic drive scheme) driving method is given as an example of a high-speed driving method.

Figure 9A:
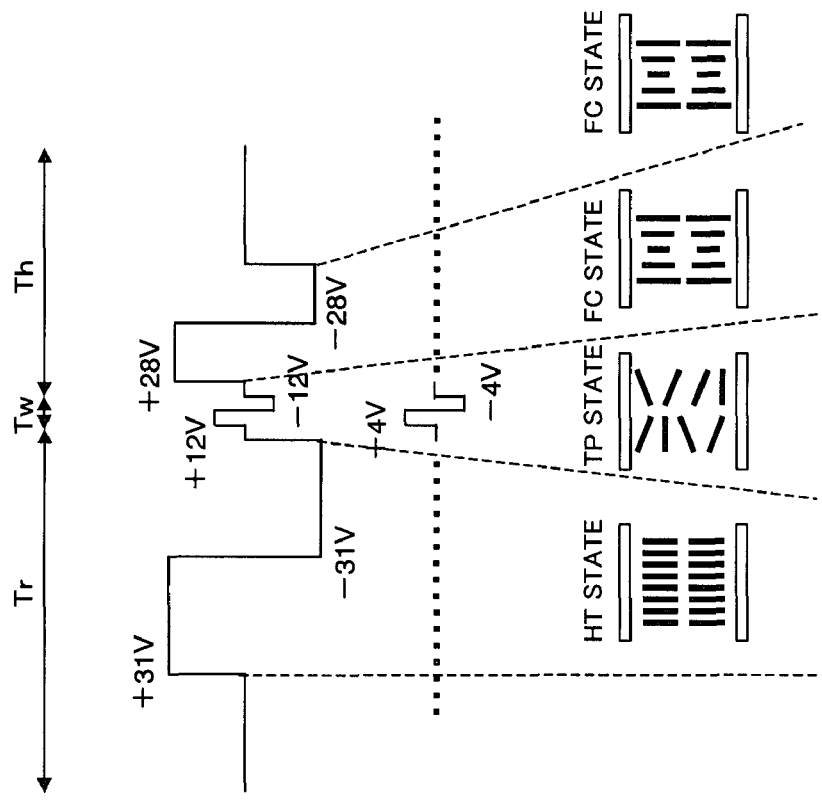
FIGS. 9A and 9B are diagrams explaining a DDS driving method used for a display element according to a second embodiment of the invention.
Figure 9B:
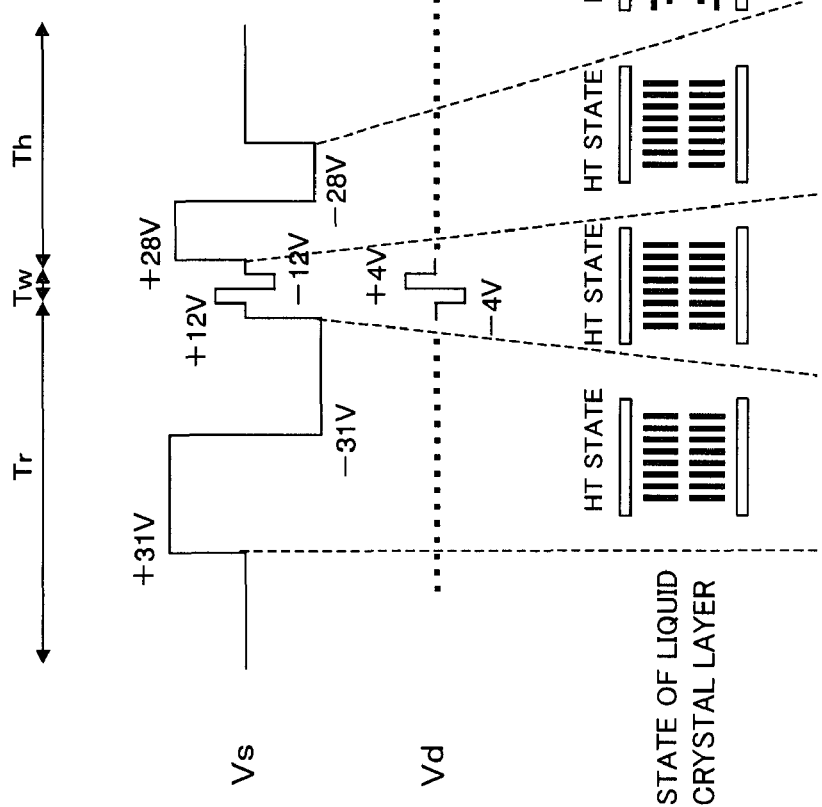

FIGS. 9A and 9B are diagrams illustrating the DDS driving method. FIG. 9A depicts a driving waveform for driving cholesteric liquid crystal in a planar state (P state), and FIG. 9B depicts a driving waveform for driving the cholesteric liquid crystal in a focal conic state (FC state). In FIGS. 9A and 9B, an upper part depicts the waveform of a data signal voltage Vd output from the data electrode driving circuit 20, a middle part depicts the waveform of a scanning signal voltage Vs output from the scanning electrode driving circuit 21, and a lower part schematically depicts the state of a liquid crystal layer. In the upper and middle parts of FIGS. 9A and 9B, a direction from the left side to the right side indicates the time elapsed, and the vertical direction indicates a voltage.

Depicted as FIGS. 9A and 9B, the DDS driving method may have three periods, that is, a reset period Tr for which the liquid crystal layer is in a homeotropic state (HT state), a write period Tw for which the final state of the liquid crystal layer is determined, and a holding period Th for which the state of the liquid crystal layer determined within the write period Tw is held.

First, a driving method of changing the liquid crystal layer to a planar state will be described. Depicted as FIG. 9A, during about the first half of the reset period Tr, the scanning signal voltage Vs is +31 V, and the data signal voltage Vd is ±4 V (not depicted). During about the second half of the reset period, the scanning signal voltage Vs is −31 V, and the data signal voltage Vd is ±4 V (not depicted). Therefore, a pulse voltage corresponding to the difference between ±31 V and ±4 V is applied to the liquid crystal layer during the reset period Tr. In this way, depicted as the lower part of FIG. 9A, the liquid crystal layer is changed to the homeotropic state. The length of the reset period Tr is in the range of, for example, several tens of milliseconds to several hundreds of milliseconds (ms).

After the reset period Tr ends, the write period Tw starts. The write period Tw is temporally divided into four periods. The length of the write period Tw is equal to or shorter than, for example, several milliseconds, and the time when positive and negative pulses are applied is equal to or shorter than, for example, 1 ms during the write period. First, during a first period, the scanning signal voltage Vs is 0 V, and the data signal voltage Vd is +4 V or −4 V. During a second period, the scanning signal voltage Vs is +12 V, and the data signal voltage Vd is −4 V. During a third period, the scanning signal voltage Vs is −12 V, and the data signal voltage Vd is +4 V. During a fourth period, the scanning signal voltage Vs is 0 V, and the data signal voltage Vd is +4 V or −4 V. Therefore, during the first and fourth periods, a voltage of ±4 V is applied to the liquid crystal layer. During the second and third periods, a pulse voltage of ±16 V is applied. In this way, depicted as the middle part of FIG. 9A, the liquid crystal layer is maintained in the homeotropic state.

After the write period Tw ends, the holding period Th starts. The holding period Th is temporally divided into two periods. During an initial period immediately after the write period Tw, a predetermined pulse voltage is applied for a time corresponding to about half the reset period Tr. During about the first half of the initial period, the scanning signal voltage Vs is +28 V, and the data signal voltage Vd is ±4 V (not depicted). During about the second half of the initial period, the scanning signal voltage Vs is −28 V, and the data signal voltage Vd is ±4 V (not depicted). Therefore, a pulse voltage corresponding to the difference between ±28 V and ±4 V is applied to the liquid crystal layer during the initial period. In this way, depicted as the lower part of FIG. 9A, the liquid crystal layer is maintained in the homeotropic state. After the holding period ends, for example, the scanning signal voltage Vs is 0 V, and the data signal voltage Vd is ±4 V. Therefore, a pulse voltage of ±4 V, which is the difference between the voltages, is applied to the liquid crystal layer. In this way, the liquid crystal layer is changed to the planar state.

Next, a driving method of driving the liquid crystal layer in a focal conic state will be described. Depicted as FIG. 9B, during the reset period Tr, the same voltage pulse as that in the method of driving the liquid crystal layer in the planar state is applied to the liquid crystal layer. In this way, the liquid crystal layer is changed to the homeotropic state.

After the reset period Tr ends, the write period Tw starts. During the first period of the write period Tw, the scanning signal voltage Vs is 0 V, and the data signal voltage Vd is +4 V or −4 V. During the second period, the scanning signal voltage Vs is +12 V, and the data signal voltage Vd is +4 V. During the third period, the scanning signal voltage Vs is −12 V, and the data signal voltage Vd is −4 V. During the fourth period, the scanning signal voltage Vs is 0 V, and the data signal voltage Vd is +4 V or −4 V. Therefore, during the first and fourth periods, a voltage of ±4 V is applied to the liquid crystal layer, and the electric field is approximately zero. During the second and third periods, a pulse voltage of ±8 V is applied. Since the voltage applied to the liquid crystal layer during the second and third periods is lower than that in the method of driving the liquid crystal layer in the planar state, the liquid crystal layer is changed to a transient planar state (TP state), depicted as the middle part of FIG. 9B. Therefore, the liquid crystal layer is in a state in which a helical structure is being formed.

During the initial period of the holding period Th after the write period Tw, when the same voltage pulse as that in the method of driving the liquid crystal layer in the planar state is applied to the liquid crystal layer, the liquid crystal layer is changed to the focal conic state. After the holding period ends, for example, the scanning signal voltage Vs is 0 V, and the data signal voltage Vd is ±4 V. Therefore, a voltage of ±4 V, which is the difference between the voltages, is applied to the liquid crystal layer, and the liquid crystal layer is maintained in the focal conic state.

As described above, when a relatively high voltage is applied to the liquid crystal layer during the write period Tw, it is possible to change the liquid crystal layer to a planar state. When a relatively low voltage is applied to the liquid crystal layer during the write period Tw, it is possible to change the liquid crystal layer to a focal conic state.

Figure 10:
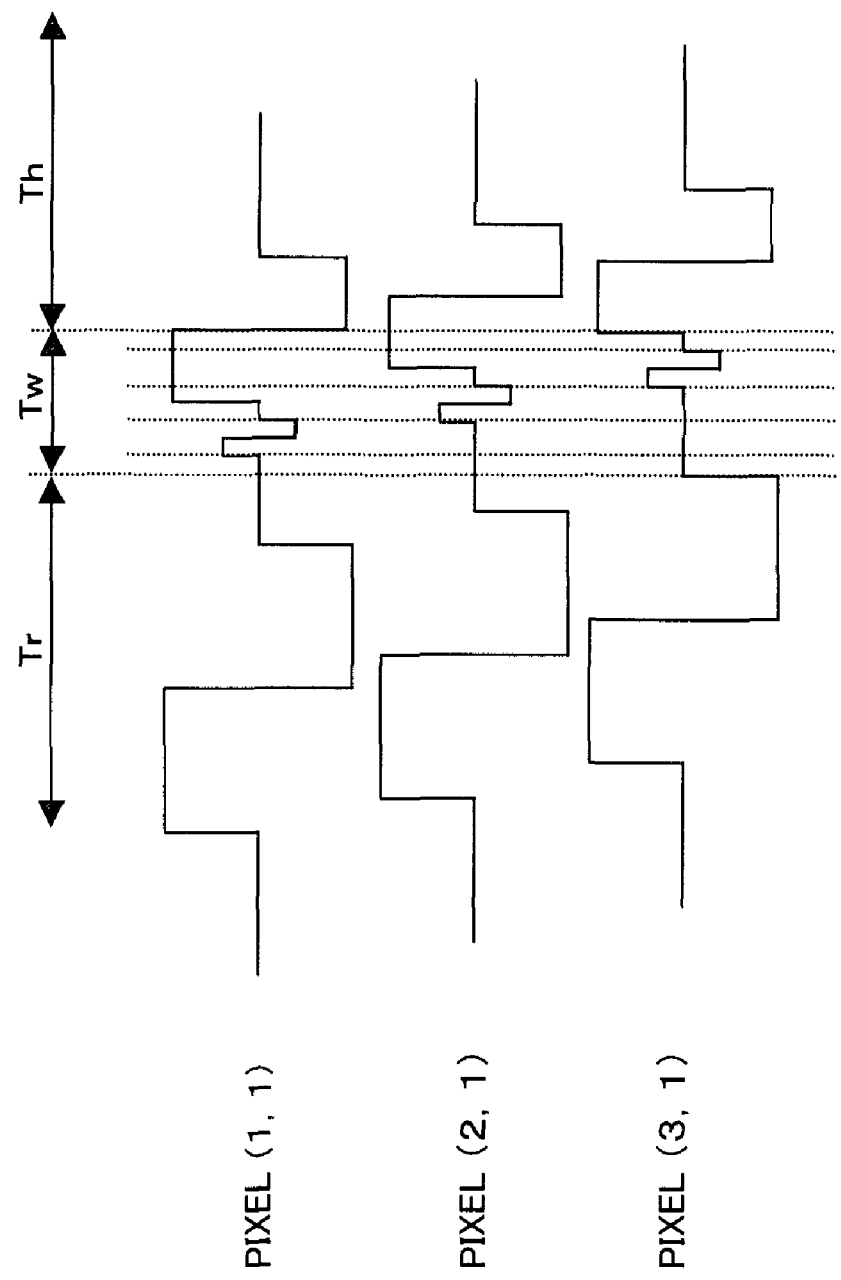
FIG. 10 is a diagram illustrating driving waveforms when the DDS driving method is applied to a reset process and a write process in a method of processing an image in the display element according to the second embodiment of the invention.
Figure 11:
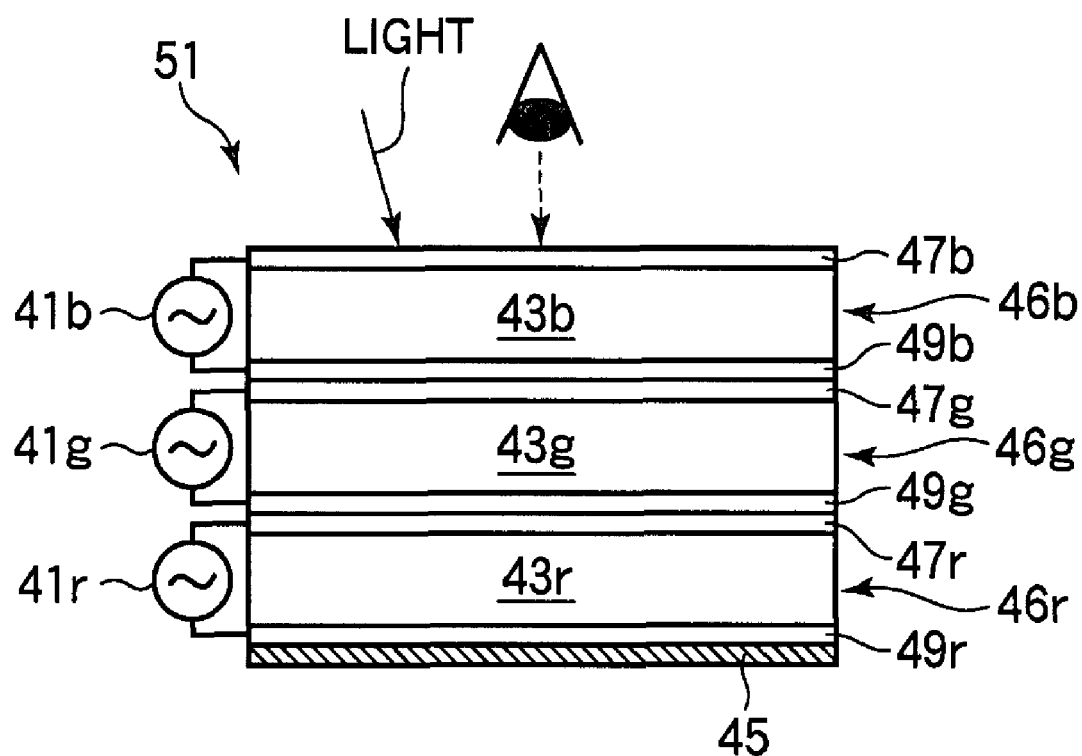
FIG. 11 is a cross-sectional view schematically illustrating the structure of a liquid crystal display element capable of performing full color display according to the related art.
Figure 12A:
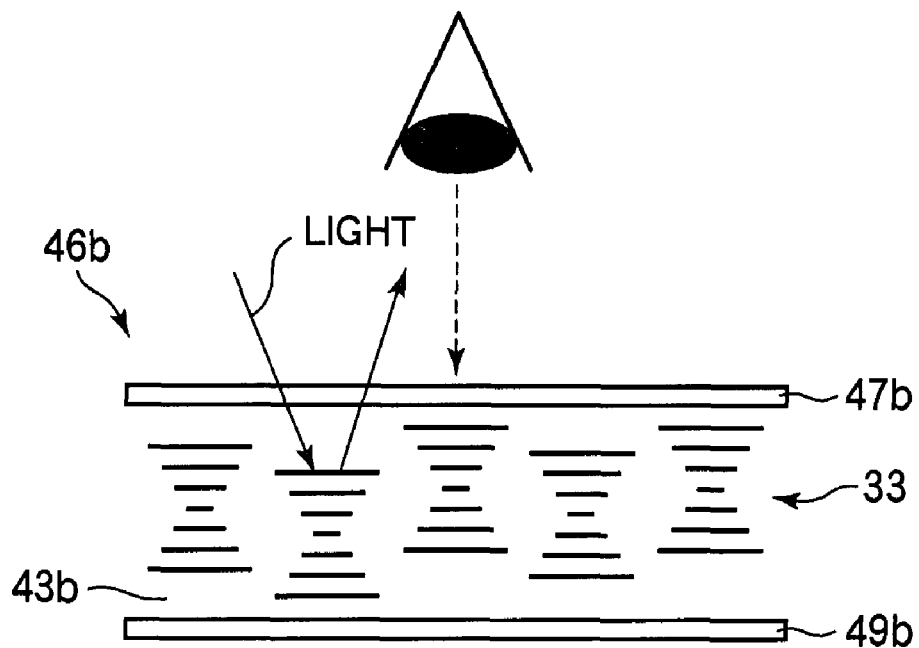
FIGS. 12A and 12B are cross-sectional views schematically illustrating the structure of a liquid crystal layer of the liquid crystal display element according to the related art.
Figure 12B:
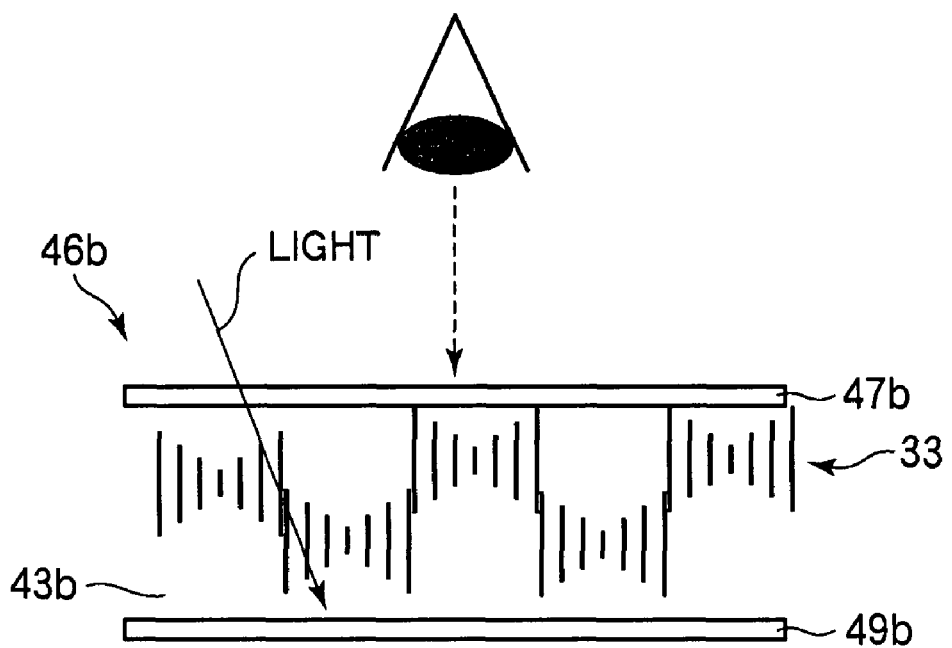

FIG. 10 is a diagram illustrating driving waveforms when the DDS driving method is applied to the reset process and the write process. FIG. 10 depicts the liquid crystal application voltages applied to the pixels (1, 1), (2, 1), and (3, 1) disposed at the intersections of the first to third scanning electrodes 17b and the first data electrode 19b, among a plurality of pixels of the B display unit 6b depicted in FIG. 1. In FIG. 10, a direction from the left side to the right side indicates the time elapsed, and the vertical direction indicates a voltage.

Depicted as FIG. 10, the reset process of Step S7 depicted as FIG. 5 is performed during the reset period Tr of the DDS driving method, and the B liquid crystal layer 3b is changed to a homeotropic state. In the DDS driving method, the time from the start of the reset period Tr of the B pixel (1, 1) to the start of the reset period Tr of the B pixel (2, 1) can be set to, for example, about 1 ms. Therefore, when the reset period Tr required for one pixel is, for example, 20 ms, the entire reset period Tr is 20+(n−1) ms (n is the number of scanning electrodes). Since three scanning electrodes 17b are depicted as FIG. 10, the reset period Tr is 22 ms.

Then, during the write period Tw of the DDS driving method, the write process of Step S8 depicted as FIG. 5 is performed on the B display unit 6b. The first to third scanning electrodes 17b are sequentially scanned, and predetermined driving data is supplied to the pixels (1, 1), (2, 1), and (3, 1). In this way, the write process of the display unit is completed. In a general driving method of a liquid crystal display element using the cholesteric liquid crystal depicted as FIG. 3, a selection period of, for example, about 20 ms is needed to drive one scanning electrode. Therefore, a selection period of 20×n (ms) is needed for all the pixels in order to drive n scanning electrodes. In contrast, in the DDS driving method, the reset period Tr can be set to 20+(n−1) ms. Therefore, the DDS driving method can drive the liquid crystal layer at a high speed, as compared to the driving method depicted as FIG. 3.

As described above, according to this embodiment, it is possible to perform the rewrite process in a short time by applying a high-speed driving method, such as the DDS driving method, to the reset process and the write process. Therefore, it is possible to improve the visibility of a display screen during the rewrite process, as compared to the first embodiment. In addition, according to this embodiment, the refresh process is performed at a time interval capable of preventing the occurrence of image sticking in the display region of the display unit 6. Therefore, it is possible to achieve a display element capable of preventing the occurrence of image sticking in a display region to obtain high display quality, similar to the first embodiment.

The invention is not limited to the above-described embodiments, but various modifications of the invention can be made. In the first embodiment, the reset process is simultaneously performed on all the pixels of all the display regions, but the invention is not limited thereto. For example, sets of scanning electrodes may be simultaneously selected among all the scanning electrodes, the reset process may be sequentially performed on the sets of scanning electrodes, and the write process may be performed after the reset process is performed on all the pixels. In this case, it is possible to obtain the same effects as those in the above-described embodiments.

In the above-described embodiments, the R, G, and B display units 6r, 6g, and 6b are configured such that they can be independently driven, but the invention is not limited thereto. For example, a predetermined output terminal of the scanning electrode driving circuit 20 may be commonly connected to predetermined input terminals of the scanning electrodes 17b, 17g, and 17r. In this case, the same voltage is applied to the scanning electrodes 17r, 17g, and 17b of the R, G, and B display units 6r, 6g, and 6b, but the same effects as those in the first and second embodiments are obtained by adjusting the voltage applied to the data electrodes such that the voltage applied to the liquid crystal layer of the display unit not subjected to the rewrite process is approximately zero.

In the above-described embodiments, a liquid crystal display element of a matrix display type is given as an example of the display element, but the invention is not limited thereto. For example, the invention may be applied to a liquid crystal display element of a segment display type using a static driving method that independently applies a voltage to only a segment to be displayed or a dynamic (multiplex) driving method that drives display segments in time series in synchronization with each other.

In the above-described embodiments, the liquid crystal display element 1 includes the optical sensor 26 and the timer 27, but the invention is not limited thereto. For example, the liquid crystal display element 1 may include only the timer 27. In this case, it is also possible to prevent the occurrence of image sticking in a display region. Therefore, the same effects as those in the above-described embodiments are obtained.

The invention can be applied to a display element in which a refresh process is performed on a display unit.

What is claimed is:

1. A display element comprising:
 a first display unit that has a first display region;
 a second display unit that is laminated on the first display unit and has a second display region arranged so as to correspond to the first display region; and
 a display control unit that performs a reset process of changing the display region to the same display state on the first display unit and starts the reset process of the second display unit.

2. The display element according to claim 1,
 wherein each of the first and second display units includes:
 a plurality of scanning electrodes;
 a plurality of data electrodes that are arranged so as to intersect the plurality of scanning electrodes; and
 a plurality of pixels that are formed at intersections of the plurality of scanning electrodes and the plurality of data electrodes and are arranged in a matrix, and
 the display control unit performs the reset process on the first or second display unit such that the plurality of scanning electrodes are simultaneously selected.

3. The display element according to claim 2,
 wherein the display control unit performs the reset process on the first or second display unit such that a voltage pulse having substantially the same waveform is simultaneously applied to the plurality of pixels.

4. The display element according to claim 1,
 wherein the display control unit starts a write process of writing image data to the first display region after the reset process of the first display unit ends, and starts the reset process of the second display unit after the write process ends.

5. The display element according to claim 1, further comprising:
 a third display unit that is laminated on the first and second display units, each having a light reflection state, a light transmission state, or an intermediate state therebetween, reflecting different color light components, includes a third display region arranged so as to correspond to the first and second display regions, has the light reflection state, the light transmission state, or the intermediate state therebetween, and reflects a light component having a color that is different from those of the light components reflected by the first and second display units.

6. The display element according to claim 5,
 wherein the display control unit performs the reset process on one of the first to third display units reflecting a color closest to the color of a display image, independently from the other display units.

7. The display element according to claim 1, further comprising:
 a detecting unit that detects the start time of the reset process.

8. The display element according to claim 7,
 wherein the detecting unit includes a measuring unit that measures a time interval capable of preventing image sticking of the display region.

9. The display element according to claim 7,
 wherein the detecting unit includes a light detecting unit that detects the illuminance of an external environment.

10. The display element according to claim 9,
 wherein, when the illuminance detected by the light detecting unit is less than a predetermined value, the display control unit starts the reset process of the first display unit.

11. The display element according to claim 5,
 wherein the first to third display units each have a memory property.

12. The display element according to claim 5,
 wherein each of the first to third display units includes:
 a pair of substrates that are arranged so as to face each other; and
 liquid crystal that is sealed between the substrates and forms a cholesteric phase.

13. The display element according to claim 12,
 wherein a DDS driving method is used for the reset process and the write process.

14. The display element according to claim 1,
 wherein the first and second display regions are display segments of a segment display type.

15. An electronic paper for displaying an image, comprising:
 the display element according to claim 1.

16. An electronic terminal apparatus for displaying an image, comprising:
 the electronic paper according to claim 15.

17. A display system for displaying an image, comprising:
 the electronic terminal apparatus according to claim 16.

18. A method of processing an image in a display element that drives a first display unit having a first display region and a second display unit laminated on the first display unit and having a second display region arranged so as to correspond to the first display region to display an image, the method comprising:
 performing a reset process of changing the display region to the same display state on the first display unit and starting the reset process of the second display unit.

19. The method according to claim 18,
 wherein the reset process is performed on the first or second display unit such that a plurality of scanning electrodes are simultaneously selected.

20. The method according to claim 19,
 wherein the reset process is performed on the first or second display unit such that a voltage pulse having substantially the same waveform is simultaneously applied to a plurality of pixels that are formed at intersections of the plurality of scanning electrodes and a plurality of data electrodes arranged so as to intersect the plurality of scanning electrodes and are arranged in a matrix.

21. The method according to claim 18, further comprising:
starting a write process of writing image data to the first display region after the reset process of the first display unit ends; and
starting the reset process of the second display unit after the write process ends.

22. The method according to claim 18,
wherein the first display unit, the second display unit, and a third display unit that is laminated on the first and second display units and has a third display region reflect different color light components, and
the reset process is performed on one of the first to third display units reflecting a color closest to the color of a display image, independently from the other display units.

23. The method according to claim 22,
wherein the reset process is performed at a time interval capable of preventing image sticking of the display region.

24. The method according to claim 23,
wherein, when the illuminance of an external environment is less than a predetermined value, the reset process of the first display unit starts.

25. The method to claim 22,
wherein a DDS driving method is used to perform the reset process and the write process.

* * * * *